(12) United States Patent
Clements et al.

(10) Patent No.: US 9,396,089 B2
(45) Date of Patent: Jul. 19, 2016

(54) ACTIVITY TRACING DIAGNOSTIC SYSTEMS AND METHODS

(71) Applicant: Apple Inc., Cupertino, CA (US)

(72) Inventors: Eric Russell Clements, San Martin, CA (US); Daniel Andreas Steffen, San Francisco, CA (US); Jainam Ashokkumar Shah, San Jose, CA (US); Vishal Patel, Sunnyvale, CA (US); Damien P. Sorresso, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 14/502,853

(22) Filed: Sep. 30, 2014

(65) Prior Publication Data

US 2015/0347265 A1     Dec. 3, 2015

Related U.S. Application Data

(60) Provisional application No. 62/005,935, filed on May 30, 2014.

(51) Int. Cl.
   *G06F 11/00*    (2006.01)
   *G06F 11/34*    (2006.01)
   *G06F 11/07*    (2006.01)

(52) U.S. Cl.
   CPC ........ *G06F 11/3476* (2013.01); *G06F 11/0778* (2013.01); *G06F 11/34* (2013.01)

(58) Field of Classification Search
   CPC ................................................. G06F 11/3476
   USPC ................. 714/45, 46, 44; 717/124, 125, 126
   See application file for complete search history.

(56) References Cited

U.S. PATENT DOCUMENTS

| | | | |
|---|---|---|---|
| 7,051,052 B1 * | 5/2006 | Shapiro | G06F 11/2071 707/610 |
| 7,200,626 B1 * | 4/2007 | Hoang | G06F 11/0751 |
| 7,263,537 B1 * | 8/2007 | Lin | G06F 17/30348 707/639 |
| 7,646,230 B2 * | 1/2010 | Parfitt | G06B 19/054 327/265 |
| 2004/0225877 A1 * | 11/2004 | Huang | G06F 21/552 713/100 |
| 2009/0164979 A1 * | 6/2009 | Fischer | G06F 11/3476 717/128 |

* cited by examiner

*Primary Examiner* — Dieu-Minh Le
(74) *Attorney, Agent, or Firm* — Blakely, Sokoloff, Taylor & Zafman LLP

(57) ABSTRACT

Systems and methods are disclosed for logging encoded diagnostic information from a sequence of processing operations, the processing operations generated by an activity in a computing environment. Diagnostic information is tracked by activity, across process boundaries where the processes can be in computationally isolated, or "sandboxed". Within each process, diagnostic information for an activity is stored in an activity-specific buffer registered with a kernel in the computing environment. For each activity in the computing system, the kernel keeps a list of all processes that have performed, or are performing, a processing task of the activity. The kernel also keeps a reference to the activity-specific log buffers for the activity for each process associated with the activity. If a processing operation for an activity fails, all activity-specific logs from all processes that are associated with the activity can be collected. A report can be generated from the collected logs for the activity.

27 Claims, 13 Drawing Sheets

ACTIVITY TRACING DIAGNOSTIC SYSTEMS AND METHODS

TECHNICAL FIELD

This disclosure relates to the field of diagnostics in computing environments, and in particular, in one embodiment to tracing a processing activity across process boundaries, or other boundaries such as computing environments, through the processes that implement the activity.

RELATED APPLICATIONS

The present U.S. Patent application claims priority under 35 U.S.C. §119(e) of the U.S. Patent Application No. 62/005,935, filed on May 30, 2014, entitled "ACTIVITY TRACING DIAGNOSTIC SYSTEMS AND METHODS," which is incorporated herein by reference to the extent it is consistent with this disclosure.

The present U.S. Patent application is related to the following U.S. Patent applications, each of which is incorporated herein by reference to the extent they are consistent with this disclosure:
(1) Application No. 62/005,927, filed May 30, 2014, entitled "METHOD AND APPARATUS FOR INTER PROCESS PRIVILEGE TRANSFER;"
(2) Application No. 62/005,929, filed May 30, 2014, entitled "METHOD AND APPARATUS FOR INTER PROCESS PRIORITY DONATION;"
(3) Application No. 62/005,931, filed May 30, 2014, entitled "METHOD AND APPARATUS FOR ACTIVITY BASED EXECUTION SCHEDULING;" and
(4) Application No. 62/005,921, filed May 30, 2014, entitled "METHOD AND APPARATUS FOR DISTRIBUTED POWER ASSERTION."

BACKGROUND

A computing environment includes one or more running processes. The processes can all be running on a single computing system, or, the processes can be spread across multiple computing systems in a networked-based or cloud-based computing environment. Each process in the computing environment can write diagnostic information to a log file. The log file of each process is private to the process that writes to the log file. The log file of a process is not accessible by other user-based processes in the computing environment.

Each process in a computing environment typically includes multiple libraries and multiple frameworks that each generate one or more threads of execution that each write diagnostic information to their log file for that process. In addition, each thread in a first process can request a service from a second process on the same computing system or on another computing system in the computing environment. The second process can generate multiple threads that each write diagnostic information to the log file of the second process. Thus, within the log file for each process, a substantial number of different threads are writing diagnostic information for the process and that information may be related to other processes.

Diagnostic information can include a wide variety of information about the state of threads that are executing within a process. This information is typically written to the log file as a free-form text string. Writing a text string message to a log is computationally expensive compared to the execution of the thread for which the log entry is written. In addition, most threads complete successfully, without a failure. Therefore, substantial computing resources are consumed in generating and storing a large amount of diagnostic information that is not related to a system failure and is of little, or no, assistance to a technician in determining a cause of a failure.

In the event of a failure of a thread in a process, a technician collects all of the logs from all of the processes within the computing environment to determine the root cause of the failure, even logs of processes that are not involved in the activity of the thread that failed.

SUMMARY OF THE DESCRIPTION

Embodiments are described for tracing a sequence of processing operations initiated by a process receiving a processing activity (or, "activity"), such as a user input or a system call. The sequence of processing operations for the activity is traced from the process receiving the activity, and continuing up to a point that the sequence of processing operations either completes successfully or fails. In one embodiment, diagnostic information for each processing operation in a sequence of processing operations of an activity can be logged in a log buffer that is specific to the activity, such that the diagnostic information in the log buffer relates only to processing operations of one activity. An activity may be performed more than once. Thus, a log buffer can include diagnostic information for multiple instances of an activity, each instance having an associated sequence of processing operations. A sequence of processing operations of an activity can span multiple processes within the computing environment. In addition, multiple instances of a sequence of processing operations for an activity can span multiple processes within the computing environment. In one embodiment, each process runs in a different memory address space, such that a first process cannot access the diagnostic information in the log buffer of a second process; the processes are computationally isolated, or "sandboxed." A first process may require one or more services from a second process to complete the processing operations for an activity. The first process can request that a second process be sent a communication including a voucher having attributes of the first process. The second process can redeem the voucher and adopt the attributes of the first process when performing processing operations on behalf of the first process.

Each process performing a processing operation for an activity can have a log buffer for logging diagnostic information of processing operations in the sequence. Diagnostic information within the log buffer(s) can be used to generate a report that traces the sequence of processing operations of the processing activity and can trace the sequence across the boundaries of computationally isolated, or "sandboxed" processes. A kernel, or other software, having the authorization to access sandboxed memory of each process, can collect the data in the log buffers from each process's memory space.

A processing activity can be, for example, a request to get mail in an email program, a request to perform a spell check operation in a word processing program, or a request to perform a sort table operation in a database program. The activity can be assigned an activity identifier (activity ID) that is unique in one of the computing environment or a process, in one embodiment. Each process that performs a processing operation for the processing activity can allocate and register an activity-specific log buffer for logging diagnostic information related to the sequence of processing operations performed to complete the activity.

Using an email program as an example process, and a request to get mail as an example of an activity in a process of the email program, a sequence of processing operations may include a operation to fetch new mail from an email server, an operation to sort the retrieved email, an operation to index words within the retrieved emails for later searching, and an operation to display the retrieved and indexed emails on a display screen. Diagnostic information for the fetch mail, sort mail, index mail, and display mail operations can be logged in a log buffer that is specific to the get mail activity within the email process. In one embodiment, diagnostic information from other activities and processing operations of the email process that are not related to the get mail activity, such as compose mail, send mail, spell check, and reply, can be logged in different log buffers than the log buffer(s) for the get mail activity. In another embodiment, logging of instances of the email process receiving one or more requests for a get mail operation, a compose mail operation, a send mail operation, a spell check operation, and an email reply operation can be stored in an activity buffer log buffer for the process.

An activity may require additional processing services outside of its own process. Using the get mail activity of the email process as an example again, the fetch mail processing operation may require accessing a remote email server via the Internet. To access the email server, the fetch mail processing operation can call an Internet services process that provides Internet services to the fetch mail processing operation on behalf of the email process. The email process can request a voucher with attributes of the email process, the get mail activity, and the fetch mail processing operation, and can send the voucher to the Internet process via inter-process communication. Upon receiving the voucher, the Internet process can request registration of an activity-specific log buffer for the get mail activity within the Internet process memory address space. Diagnostic information of Internet services processing operation(s) can be logged in the get mail activity log buffer of the Internet process. If a get mail activity processing operation fails within, e.g., the Internet process, then diagnostic information in all of the get mail activity log buffers can be collected and a report can be generated of diagnostic information that is all related to the get mail activity sequence of processing operations. In this example, the get mail activity log buffer from the email process and the get mail activity log buffer from the Internet process can be collected and used to generate the report.

In another embodiment, a process can log the receipt of one or more instances of one or more processing activities. For each activity received, the process can determine whether the activity has an existing activity ID known to the process. In response to determining that the processing activity does not have an existing activity ID for the process, the process can request and receive an activity ID that is unique within one of the computing environment or the process. In one embodiment, an initial instance value is determined for the activity ID. The instance value can be used to distinguish a first instance of the processing activity received by the process from a subsequently received instance of the activity. In an embodiment, if a subsequent instance of the activity is received by the process, the instance value can be increased. Logging an occurrence of the activity ID can include storing a timestamp of the processing activity, and the activity ID, and in some embodiments, an instance value of the activity ID. In one embodiment, the process can further determine that the activity log buffer is within a threshold value of being full. If so, an oldest activity log buffer entry can be overwritten with a new activity log buffer entry.

In yet another embodiment, a computing environment can determine that a processing operation in a process has failed. The processing operation has an associated activity ID and, in some embodiments, an instance value of the activity ID. The computing environment can extract one or more log buffer entries from a log buffer that is associated with the activity ID within the process. A log buffer entry can include a timestamp, a processing operation identifier, an instance value of the activity, and one or more parameters. Log buffer entries can be extracted based upon one or more of the timestamp, processing operation identifier, or instance value, and further by one or more parameters. In one embodiment, the log buffer entries can be extracted based on the processing operation having the activity ID of the failed processing operation. In addition, or alternatively, log entries of an activity log buffer of all activities received by the process can be extracted from the process in which the processing operation failed. In an embodiment, the log buffers can be decoded into human-readable text in one of the kernel or a diagnostic service. Activity log buffer entries can include a timestamp and an activity ID of an activity received by the process. In one embodiment, activity log buffer entries further include an instance value of the activity ID of an extracted activity log buffer entry.

In still another embodiment, a diagnostics service can receive one or more log buffers from a computing environment, each log buffer corresponding to a different process. Each log buffer can contain log buffer entries associated with an activity ID that is also associated with a failed processing operation. In one embodiment, each log buffer entry can include a process identifier that identifies one of the different processes, a processing operation identifier, a timestamp, an activity ID, an instance value associated with the activity ID, and one or more parameters. The processing operation identifier can correspond to a text string that describes the processing operation logged. Log entries received from the one or more log buffers can be collated into an order. Log entries can be collated by timestamp, by process identifier, by processing operation identifier, or activity ID, or activity ID and instance value. In one embodiment, for each of the collated log entries, the entry can be translated into human-readable text using the processing operation identifier to retrieve a message text and formatting string that can be used to format the one or more parameters into the message text to generate the human-readable text. In one embodiment, the processing operation identifier can be a hash value used to look up the message text and formatting string. The collated translated log entries can be transmitted to a crash reporting system. In some embodiments, the log entries can be filtered according to filtering criteria, such: as a timestamp range, a process identifier, or an instance value of the activity ID. In one embodiment, the one or more log buffers are received in response to a failure of a processing operation having the activity ID.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for tracing processing operations, generated by an activity, across process and computing environment boundaries.

Figure 1:
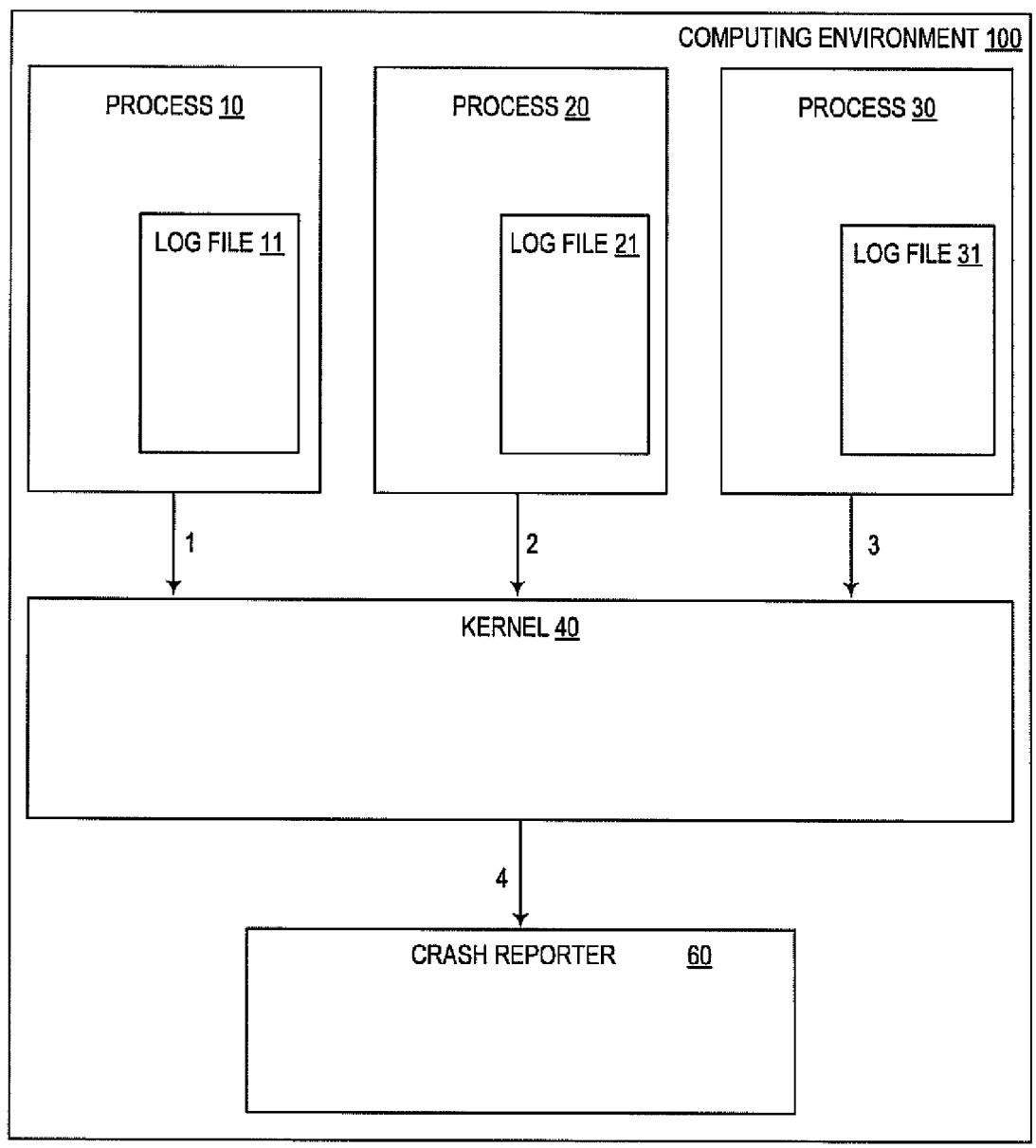
FIG. 1 illustrates a block diagram of diagnostic logging in a computing environment, in the prior art.

FIG. 1 illustrates a block diagram of a computing environment 100 that logs diagnostic information according to the prior art. Computing environment 100 includes one or more computing processes, such as process 10, process 20, and process 30. Each process 10, 20, and 30 includes a respective log file 11, 21, and 31 within the memory space of the process. When diagnostic information logging is enabled in computing environment 100, each process 10, 20, and 30 writes diagnostic information into its own respective log file 11, 21, and 31.

Examples of diagnostic information can include logging the receipt of a request for a service of a process; logging the starting of execution of a process to fulfill the request; logging a request by a thread for a service from another process; logging a reply received by the thread from the another process; logging the successful completion of the thread; and logging the failure of execution of the thread. Diagnostic information, in the prior art, is typically a text message string that describes a computing action performed by a specific processing operation. The message string may conform to a standardized format. For example, "syslog" (Internet Engineering Task Force, RFC 5424) is a computer diagnostic information message format in which messages are labeled with a facility code, a severity level, and additional information of the process that generated the message. Syslog messages vary in length and may be as long as 1024 bytes per message. Other diagnostic information formats include, Common Log Format, Extended Logfile Format, and Pantheios, in addition to proprietary formats.

The above diagnostic information logging formats, and many proprietary logging formats, include features similar to syslog. A disadvantage of these prior art logging methods is that formatting and storing lengthy text messages requires substantial computing resources. The processing overhead burden of logging text diagnostic information can be high enough to cause a system to miss logging of one or more significant processing events. Further, in the prior art diagnostic logging may be disabled by default, until explicitly enabled, to reduce the performance burden of diagnostic logging on end-user performance. When diagnostic logging is disabled, to diagnose a problem an end-user must first detect that a problem occurred, then enable diagnostic logging, and hope that the problem recurs and that the cause is captured by the diagnostic logging and is not missed due to the high processing overhead of the prior art logging. Another disadvantage of the prior art diagnostic logging is that most processing operations in a computing environment complete successfully. Thus, the log files 11, 21, and 31 contain substantial amounts of text that is related to processing operations that have successfully completed, making it difficult for a technician to sift through the text of the successfully completed processing operations to find the diagnostic information of the few processing operations involved in a failure. In addition, in the prior art each process logs diagnostic information for all processing activities performed by the process, not just a specific processing activity associated with a failure. Further, each log file 11, 21, and 31 contains only diagnostic information of the process that generated the log file, making it difficult to identify inter-process relationships between processing operations in the separate log files.

In the prior art, when a processing operation fails, kernel 40 reads 1, 2, and 3 the respective log files 11, 21, and 31 of all processes 10, 20, and 30 in the computing environment, regardless of whether the process performed a processing task related to the activity that resulted in a failed processing operation. The kernel passes all of the log files 11, 21, and 31 to crash reporter 60 via inter-process communication 4. A technician extracts the text from log files 11, 21, and 31 from the crash reporter 60 and processes the text by aligning in time the log entries to match them in time in order to trace operations across process boundaries to determine a cause of the failure of the failed processing operation.

Figure 2:
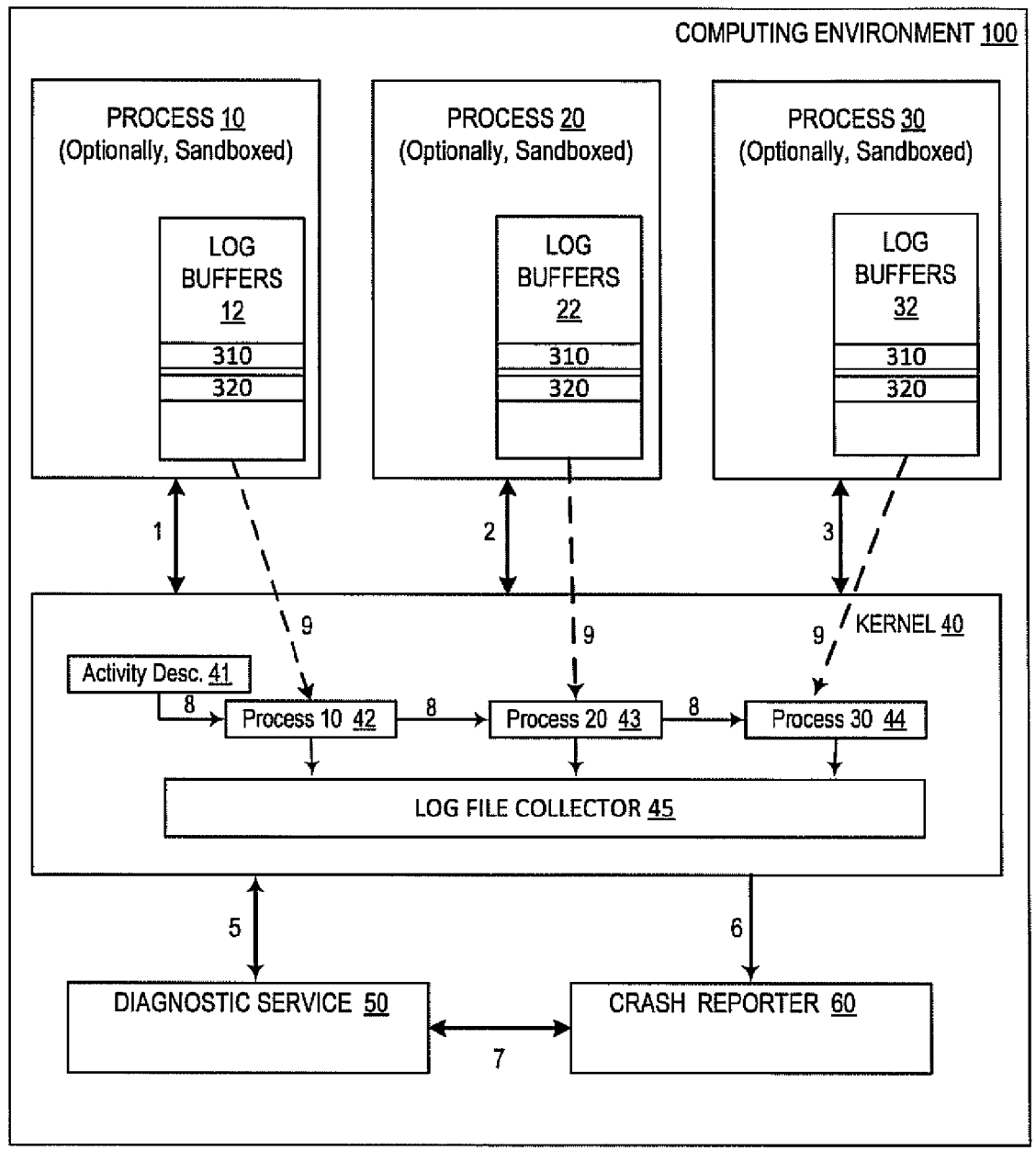
FIG. 2 illustrates a high-level block diagram of a system for activity tracing of diagnostic information logging in a computing environment.

FIG. 2 illustrates a high-level block diagram of a system for activity tracing of diagnostic information logging in a computing environment 100. Computing environment 100 includes one or more processes, such as process 10, process 20, and process 30. In an embodiment, processes 10, 20, and 30 can be computationally isolated, or "sandboxed," such that each these processes cannot access memory used by another of these processes. In such an embodiment, process 10, e.g., can only read from, and write to, log buffers 12 within process 10. Process 10 cannot read from, or write to, log buffers 22 of process 20 or log buffers 32 of process 30 when the processes are sandboxed. Similarly, process 30 can only read from, and write to, log buffers 32. Process 30 cannot read from, or write to, log buffers 12 and 22 of processes 10 and 20 respectively.

When a process, e.g. process 10, is initialized, the process requests an allocation of memory from kernel 40 for log buffers, e.g. log buffers 12, via interface 1. The kernel 40 can return a reference to process 10 via interface 1 and the kernel 40 can maintain a reference to the memory allocated for log buffer 12. Log buffer 12 can include buffer 310 for storing one or more instances of one or more activities received by the process, and a log buffer 320 for storing diagnostic information regarding a particular activity of the process. An embodiment of a log buffers memory structure, such as log buffers 12, is described in detail below with reference to FIG. 3. Similarly, processes 20 and 30 can also request and receive an allocation of memory from kernel 40 for log buffers 22 and 32, respectively, via interfaces 2 and 3 respectively. In one embodiment, interfaces 1, 2, and 3 can be inter-process communication, sockets, shared memory, a system call, or an Application Programming Interface (API). Application Program Interfaces are described in detail below with reference to FIG. 12. Interfaces 1, 2, and 3, need not be implemented using the same method. For example, interface 1 can be by shared memory, whereas interfaces 2 and 3 are implemented via an API.

The following features will be described with reference to process 10. The features also apply to process 20 and process 30. When a process, e.g. process 10, receives a request to perform a processing activity (or, "activity"), process 10 can request, via interface 1, that the kernel 40 generate a unique identifier for the activity (activity ID) and return the activity ID to the process 10. The activity can originate from a user input or other user activity or from a system event. In one embodiment, the activity ID is unique with respect to process 10. Alternatively, the activity ID can be unique with respect to computing environment 100. Kernel 40 can then generate an activity ID, and store an activity description record 41 for the activity. The activity description record 41 maintains a linked list 8 of processes that perform processing operations for the processing activity having the activity ID of the activity description record 41. The activity description record 41 can include the activity ID and a text description of the activity, such as "request to get mail," "request to calculate spreadsheet," "request to sort database," "request to spell-check document" or other processing activity. The kernel 40 can collect and store other relevant information in the activity description record 41, such as a timestamp of the request for the activity ID, a system identifier of a computing system making the request, or a network interface address from which the request was received. Kernel 40 can return the activity ID to the requesting process 10 via interface 1. Process 10 can determine an available log buffer 320 within log buffers 12 in which diagnostic information will be stored for the processing activity having the activity ID. Process 10 can then request that kernel 40 register process 10, and a reference 9 to log buffer 320, with activity description 41 of activity ID, via interface 1. Kernel 40 can then generate a process reference record 42 for process 10 and link 8 the process reference record 42 for process 10 to the activity description record 41.

In an embodiment, a processing operation for the activity that is running in process 10 can call process 20 to perform a service on behalf of process 10. In response to receiving a call from process 10 for the activity, process 10 can send a voucher containing attributes of process 10 and the processing activity to process 20. Vouchers are described in detail below, with reference to FIG. 8. The voucher can be sent using inter-process communication, sockets, shared memory, system calls, or API, via the kernel 40, using reference to interfaces 1 and 2. On receipt of the voucher, process 20 redeems the voucher with voucher management module 210, and obtains the activity ID from the voucher. If the activity ID is unknown to process 20, then process 20 can determine an available log buffer 320 within log buffers 22 in which diagnostic information will be stored for the processing activity having the activity ID. Process 20 can then request that kernel 40 register process 20, and a reference to log buffer 320, with activity description 41 of activity ID, via interface 2. Kernel 40 can then generate a process reference record 43 for Process 20 and link 8 the process reference record 42 for process 20 to the activity description record 41. In an embodiment, process reference record 43 for process 20 is linked 8 to activity description record 41 at process reference record 42 for process 10, thereby indicating an implied ordering in which the respective processes were associated with the processing activity. Similarly, process 20 can request that process 30 perform a service on behalf of process 20 for the activity having the activity ID. Analogous operations are performed for process 30, if either process 10 or process 20 calls process 30 to perform a processing operation for the processing activity having the activity ID.

Assuming that processes 10, 20, and 30 each perform a processing operation for the activity having the activity ID, the resulting data structure in the kernel 40 can include the activity description record 41 for the activity, and a linked list 8 of all of the processes that perform one or more processing operations for the activity. Each process 10, 20, and 30 has an identified log buffer 320 for the activity within its respective log buffers 12, 22, and 32. Each log buffer 320 can store diagnostic information of the processing operations for the activity, generated by their respective processes 10, 20, and 30. In addition, each process 10, 20, and 30 can optionally have an activity log buffer 310 that stores one or more instances of one or more activities received by the process. Collectively, the activity log buffer 310 and log buffer 320 for an activity may be referred to as log buffers 3x0. The log buffers 3x0 can all be read by the kernel 40 via the activity description record 41 for the activity, and the associated linked list 8 of process reference records 42, 43, and 44 that each contain a reference 9 to their respective log buffer 320 for the activity. In an embodiment, the reference 9 can include a reference to entire log buffer structure 12, 22, and 32, and further include a descriptor value such as a memory offset, a buffer number, or other identifier that points within the log buffer structure 12, 22, and 32, to identify a specific log buffer 320 for the activity. In one embodiment, the descriptor value need not be the same for all buffer structures 12, 22, and 32 for a specific activity.

In the event that a processing operation of an activity fails, the kernel 40 can notify the crash reporter 60 of the failure, via interface 6. The crash reporter 60 can request, via communication interface 7, that diagnostic service 50 collect and process log buffers 320 from the processes 10, 20, and 30 that performed a processing operation for the activity. The diagnostic service 50 can request, via interface 5, that the kernel 40 collect all log files 320 associated with the activity and, and optionally activity log buffer 310. The log file collector 45 can use activity description record 41 to access the linked list 8 of process reference records 42, 43, and 44 that each reference a log file 320 of a process that performed one or more processing operations for the activity. Log file collector 45 can use the references 9 to the log buffers 3x0 to read the log buffers 3x0 from each of the log buffers memory 12, 22, and 32 for processes 10, 20, and 30 respectively. The log file collector 45 can then pass the collected log files 3x0 to the diagnostic service 50 for processing. In addition to the log files 3x0, in one embodiment, the log file collector 45 can also pass information from the activity description record 41 and/or the process reference records, e.g. 42, 43, and 44, to the diagnostic service. The diagnostic service 50 can translate the activity description record 41 and/or the process reference records 42, 43, and 44 to human-readable text. The diagnostic service 50 can translate the log files 320 into human-readable text as described in detail, below, with reference to FIG. 11. The diagnostic service 50 can perform additional processing on the log files 320 before, or after, translating the log files into text, as described in detail with reference to FIG. 11 below. The diagnostic service 50 can then transmit the processed and translated log files to the crash reporter 60 via communication interface 7. Interfaces 5 and 6, and communication interface 7, can be implemented using inter-process communication, shared memory, sockets, a system call or an Application Programming Interface (API).

Figure 3:
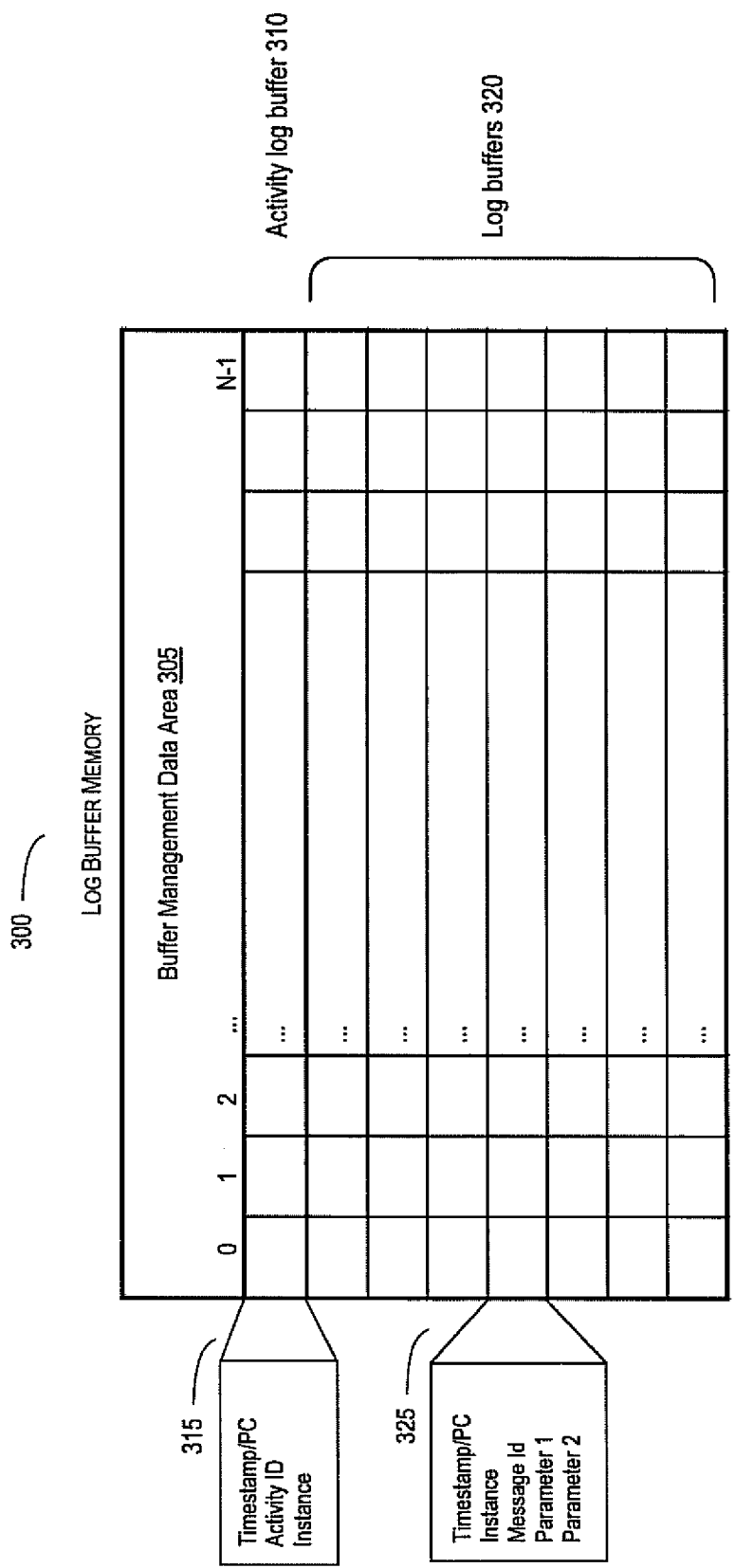
FIG. 3 illustrates an embodiment of log buffer memory allocated for a single process.

FIG. 3 illustrates an embodiment of log buffer memory 300 allocated to a process 10, 20, or 30 by kernel 40 of FIG. 2, upon initialization of the process. The log buffer memory 300 can include a buffer management data area 305, a high-level activity log buffer (or, "activity log buffer") 310, and one or more log buffers 320 (collectively, log buffers 3x0). In one embodiment, the log buffer memory 300, and the logs 3x0 within log buffer memory 300, can be computationally isolated, or "sandboxed," such that one process cannot read from, or write to, the logs 3x0 of another process. The kernel 40 can keep a reference to the log buffer memory 300 so that the kernel 40 can read the logs 3x0 implemented therein. The kernel 40 can further utilize the memory reference 9 to the log buffer memory 300 to deallocate the log buffer memory 300 upon termination of the process for which the log buffer memory 300 was allocated.

Activity log buffer 310 can store an instance of each activity received by the process in which the activity log buffer 310 is allocated. The activity log buffer 310 for a process gives a technician a high-level view of the processing activities requested of a process, and the order in which the activity requests were received. The activity buffer 310 is, in effect, a genealogy of the state of a process, or "breadcrumbs" on a path, leading up to a processing failure. In one embodiment, each log entry 315 in an activity buffer 310 can include an activity identifier (activity ID) of an activity received by the process, and the timestamp that the activity was received by the process. The activity ID can be used to reference descriptive information about an activity that is stored in the activity description record 41 of a process. In one embodiment, the activity ID can be used to retrieve a text string that describes the activity. The text string can be stored in a binary of the process, in a library, or other string pool accessible to the kernel 40. The activity buffer log entry 315 can include a processor program counter (PC) in addition to the timestamp. The activity buffer log entry 315 can further include an instance value of the activity indicating a specific instance of the activity being received by the process. Each activity received by a process has an associated log buffer 320, in which diagnostic information is logged related to processing tasks for only one activity. Each log buffer entry 325 can include a timestamp associated with the diagnostic information logged, an instance value of the activity for which diagnostic information is being logged in this activity log buffer 320, a message identifier (message ID) indicating a specific piece of diagnostic information about a processing operation, and optional parameter values 1 and 2. The message ID and parameters 1 and 2 are described in detail with reference to FIG. 11 below. Although parameters 1 and 2 are shown, more parameters may be used. The data type of the parameters can differ from one another.

In one embodiment, a portion of a log buffer 320 can be carved out for each instance of a processing activity that logs diagnostic information to the log buffer 320. In such an embodiment, storing the instance value can be optional.

In one embodiment, the log buffers 3x0 are ring buffers. Alternatively, logs 3x0 can be first-in-first-out (FIFO), last-in-first-out (LIFO), or other buffer data structure type. The logs 3x0 need not be the same buffer data structure type. In one embodiment, each log 3x0 entry is of a fixed length. The length of activity log buffer entries 315 can differ from the length of log buffer entries 325. The length of log entries 325 of different activity log buffers 320 within a log buffer memory 300 of a process can differ. Although activity buffer 310 and log buffers 320 are both shown as having N entries, 0 . . . N−1, this need not be the case. Different logs 3x0 can have different numbers of log entries. In an embodiment, each log 3x0 entry has a fixed data length that is a multiple of a data type length, the data type being known to the computing system on which the process is running. For example, each log 3x0 entry in process 10 can be a multiple of 32 bits, while each log 3x0 entry in process 20 can be a multiple of 64 bits. In an embodiment, the number of entries, e.g. N, of a log buffer 3x0 is a power of two, thereby enabling buffer management logic to use fast, binary masking or modulo arithmetic for buffer management. Utilizing the above log buffer features, diagnostic information logging is extremely fast and utilizes very little overhead processing. In one embodiment, diagnostic information logging is always enabled ("always ON").

Buffer management data area 305 includes memory for log buffer management variables, pointers, activity-to-buffer correspondence information, and data references to manage the implementation of each log buffer 3x0.

Figure 4:
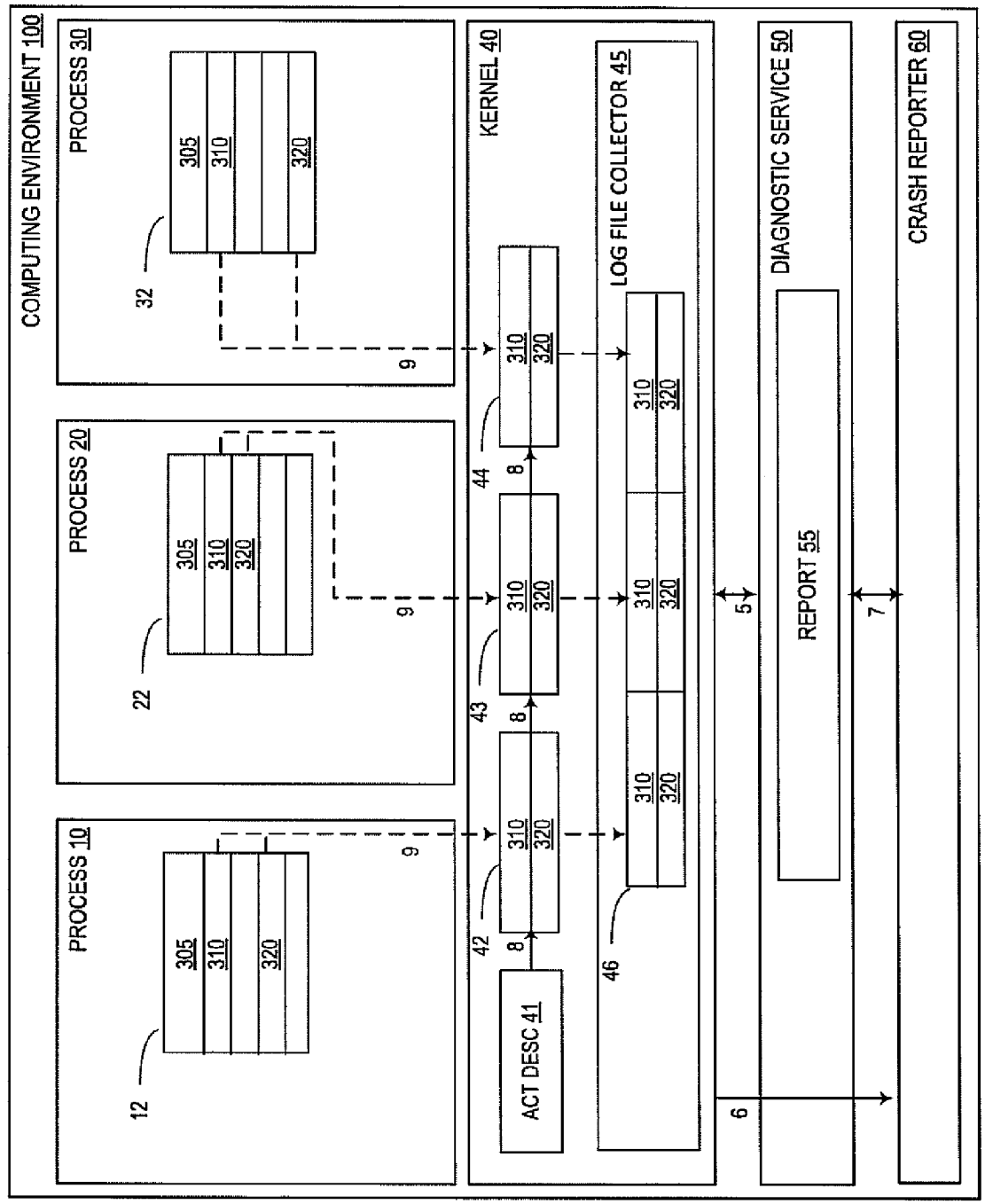
FIG. 4 illustrates a detailed block diagram of a system for activity tracing of diagnostic logging in a computing environment.

FIG. 4 illustrates a detailed block diagram of a system for activity tracing of diagnostic logging in a computing environment 100. As described with reference to FIG. 2, above, a computing environment 100 can include processes 10, 20, and 30, a kernel 40, a diagnostics service 50, and a crash reporter 60. Kernel 40 can include an activity description record 41, and a linked list 8 of process reference records, e.g. process reference records 42, 43, and 44 that correspond to processes, e.g. 10, 20, and 30, that have each performed one or more processing tasks in response to receipt of the activity in the activity description record 41. Each process, e.g. 10, 20, and 30, can include a log buffer memory 12, 22, and 32 respectively, each of which includes log buffer management data area 305, an activity buffer 310 that stores an instance of each activity received by the process corresponding to the log buffer memory, and a log buffer 320 that logs diagnostic information about one or more processing operations performed by the process, the diagnostic information in the log buffer related to the activity in the activity description record 41.

In an example, process 10 receives a new processing activity, registers the activity with the kernel 40, thereby creating activity description record 41, then process 10 calls process 20 to perform a processing operation for the activity on behalf of process 10. Additionally, assume that process 20 calls process 30 to perform a processing operation for the activity on behalf of process 20, and that the processing operation in process 30 fails. Then the kernel 40 can inform the crash reporter 60, using interface 6, that the processing operation in process 30 for the activity has failed. The crash reporter 60, using interface 7, can request that the diagnostic service 50 collect all relevant log buffers and produce a report 55 to be passed to the crash reporter 60 using interface 7. Process description records 42, 43, and 44, in the linked list 8 of processes that performed processing operations for the activity, can each have a reference 9 to their respective log buffer memories 12, 22, and 32, and a reference 9 to the relevant activity log buffer 310 and log buffer 320 for the activity (collectively, log buffers 3x0) contained therein. Log file collector 45 in kernel 40 can utilize these references 9 to collect the log buffers 3x0 from each process 10, 20, and 30 and pass the collected files 46 to diagnostic service 50 via interface 5.

In one embodiment, diagnostic service 50 can process the collected logs files 46 prior to, or as an operation of, preparing the report 55. Processing the log files 46 can include certain diagnostic information in one or more of the log buffers 3x0 such as, excluding diagnostic information before a specified timestamp or program counter value, or excluding high-level activity information in activity logs buffers 310 for one or more processes. Diagnostic service 50 can then translate the diagnostic information contained with the processed log files to human-readable text as described with reference to FIG. 11, below.

In one embodiment, interfaces 5, 6, 7, and 9 can be inter-process communication, sockets, shared memory, a system call, or an Application Programming Interface (API). Application Program Interfaces are described in detail below with reference to FIG. 12. Interfaces 5, 6, 7, and 9, need not be implemented using the same operation for all interfaces. For example, interfaces 5 and 6 can be by shared memory, e.g., whereas interfaces 7 and 9 can be implemented via an API, e.g.

Figure 5:
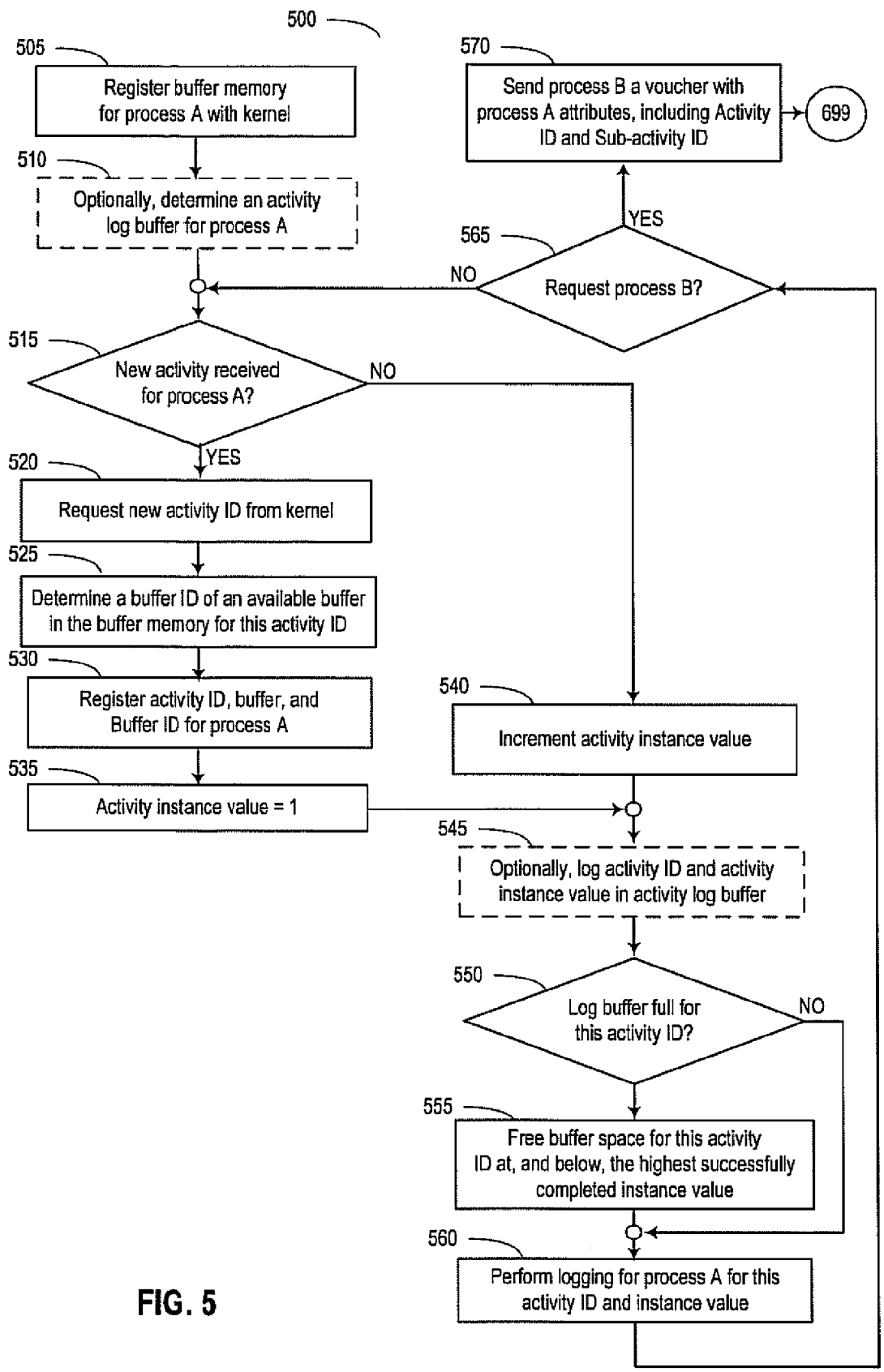
FIG. 5 illustrates a flow chart of a method for logging diagnostic information within a first process.

FIG. 5 illustrates a flow chart of a method 500 for logging diagnostic information within a first process, process A, in a computing environment 100. The operations of the method can be performed utilizing the structure described above. In operation 505, the first process, process A, is initialized. During initialization, the first process can request an allocation of log buffer memory from the kernel 40, e.g. log buffer memory 300 of FIG. 3. The first process can request that the log buffer memory 300 be registered with the kernel 40 such that the kernel 40 can read diagnostic information from the log buffer memory 300, even after a processing operation of the first process has failed.

Optionally, at operation 510, the first process can also determine an activity log buffer 310 within the log buffer memory 300 for logging one or more instances of one or more activities received by the process. The activity log buffer 310 can also be registered by the kernel and associated with the first process. After initialization, the first process can begin receiving requests to perform processing activities.

In operation 515, the first process receives a request to perform a processing activity. The first process can determine whether the activity is new to the first process, or whether the activity has been previously received by the first process.

If the activity is new to the first process, at operation 520, the first process can request a new activity identifier (activity ID) for the activity from the kernel 40. The activity ID can be unique within the first process. In one embodiment, the activity ID is unique within the computing environment 100.

In operation 525, the first process can determine an available log buffer 320, from within the log buffer memory 300 for the process. The log buffer 320 is for logging diagnostic information for the received activity ID.

In operation 530, the first process can register the activity ID, log buffer 320, and a log buffer descriptor so that the kernel 40 can access the specific log buffer 320 for the activity within the one or more activity log buffers 320 in log buffer memory 300. Registration can include generating an activity description record 41, generating a process reference record, e.g. 42, and linking 8 the process reference record to the activity description record 41. In one embodiment, the registration process occurs within kernel 40. Alternatively, registration can be implemented using a registration service accessible by the kernel 40.

An initial instance value of the activity ID can be set in operation 535. In one embodiment, the initial instance value of the activity ID can be one.

If, in operations 515, the activity received by the first process is not a new activity for the process (i.e., an instance of the activity was previously received by the first process), then the first process can increase the instance value of the activity in operation 540. In one embodiment, the activity instance value is increased by being incremented.

In operation 545, the first process can optionally log the activity ID and instance value of the activity received by the process, in activity log buffer 310. In one embodiment, activity log buffer 310 is a circular, or ring, buffer. Thus, the activity log buffer 310 can continuously log activity IDs and instance values as they are received. In one embodiment, the activity log buffer 310 overwrites the oldest activity ID and instance value in the activity log buffer 310 as new activities and/or instances of activities are received by the process.

In operation 550, the first process can determine whether the log buffer 320 for the activity is within a threshold value of being full. In one embodiment, the threshold is within 10% of the number of buffer entries available for the buffer 320. If so, in one embodiment, the first process can determine a highest instance value for the activity that has successfully completed all processing operations for the activity within the process.

In operation 555, the first process can then free buffer space in the log buffer 320 for the activity at, and below, the highest instance for the activity that has successfully completed all processing operations for the activity within the first process. In another embodiment, in operation 555, the first process can call the kernel 40 to determine, for all processes that are, or have been, performing processing operations for the activity, the highest instance value of the activity for which all processing operations for all processes performing a processing operation for the activity have successfully completed. In one embodiment, the kernel 40 can make the determination by maintaining a variable representing the highest instance value of the activity that has completed all processing operations for each process. The variable can be maintained by the kernel 40 within the process reference record, 42, 43, or 44, for the process within the kernel. In another embodiment, the kernel can inspect the activity log buffer 320 of each process to make the determination. In yet another embodiment, the first process can maintain a variable for tracking the highest instance value of an activity that has completed all processing operations for the first process. The first process can maintain this variable in the buffer management area 305.

In operation 560, the first process can log diagnostic information for the activity ID and instance value in log buffer 320 for the activity. Diagnostic information is described in detail with reference to FIG. 11.

In operation 565, the first process can determine whether the services of a second process, process B, are needed to complete the processing activity. If the first process determines that processing of the activity does not require a service from a second process, then the method resumes at operation 515.

In operation 565, if the first process determines that the services of a second process, process B, are needed to complete the activity, then the method continues at operation 570.

Figure 8:
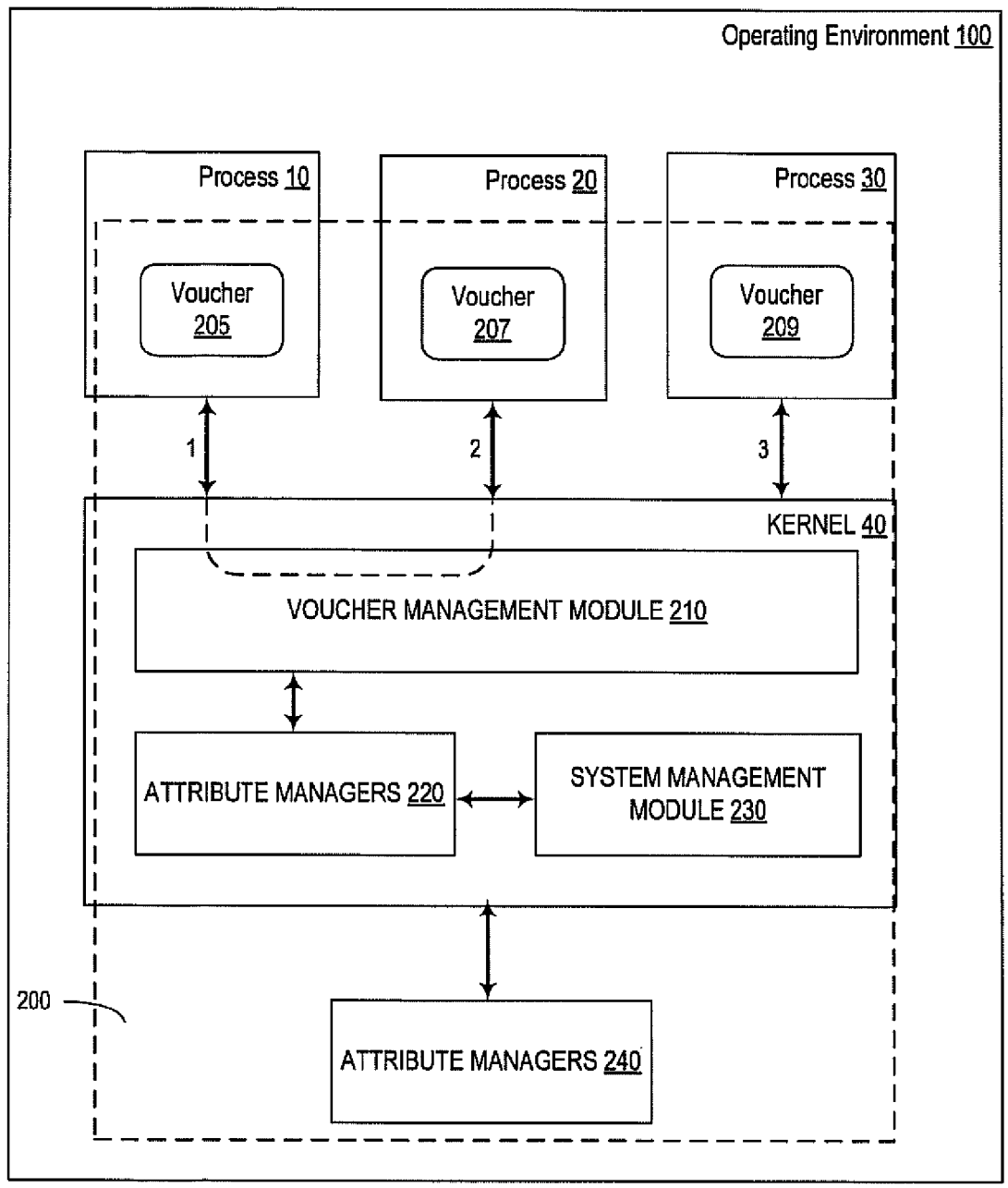
FIG. 8 illustrates a block diagram of a voucher system.

In operation 570 the first process can request that voucher management module 210 send a voucher reference, e.g. 207, to the second process, as described in detail below with reference to FIG. 8. The first process can then request that the second process, process B, perform one or more processing operation behalf of the first process as shown in FIG. 8. The method continues at connector 699, which is described with reference to FIG. 6.

Figure 6:
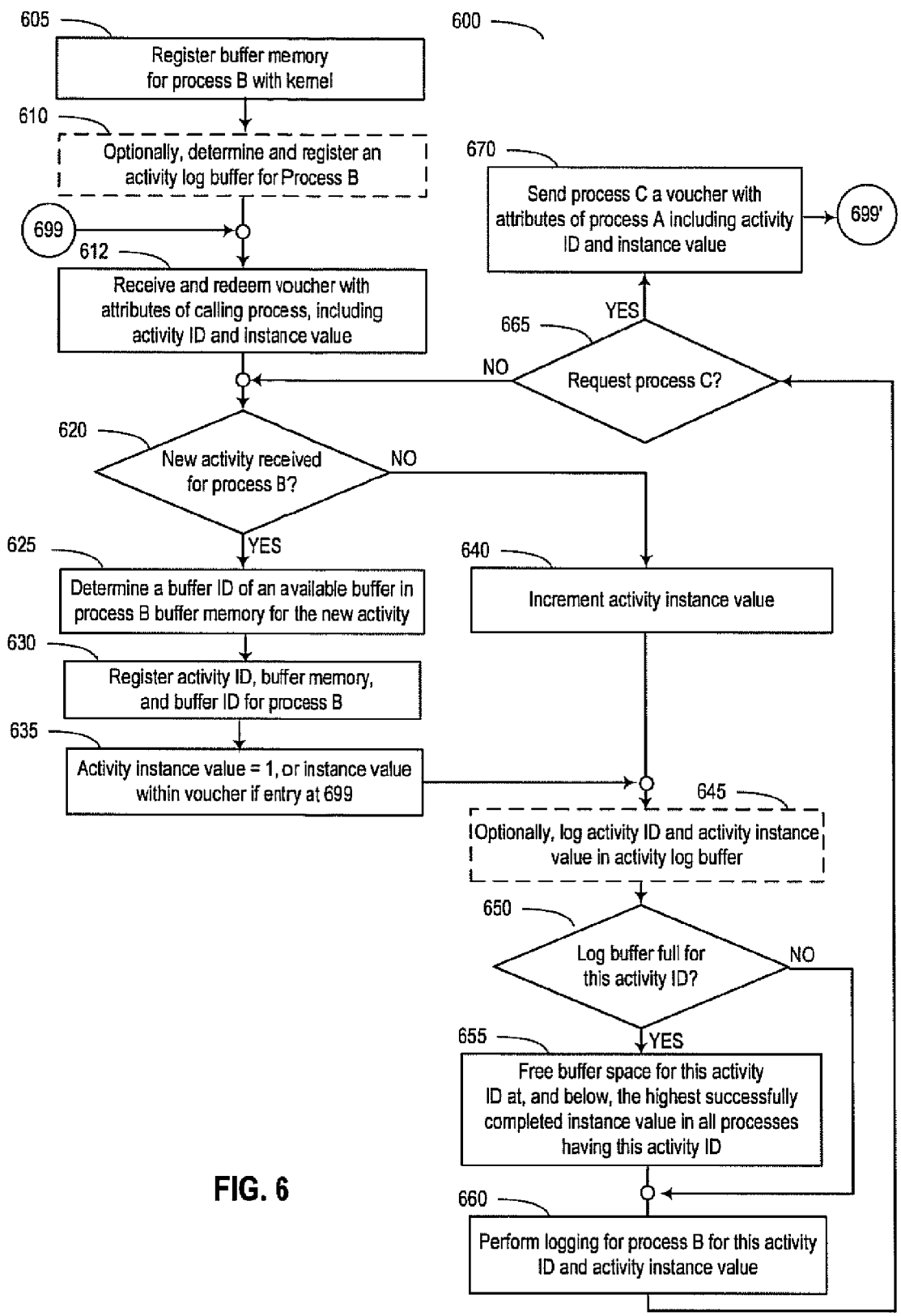
FIG. 6 illustrates a flow chart of a method for logging diagnostic information for an activity in a second process, the second process called by the first process.

FIG. 6 illustrates a flow chart of a method 600 for logging diagnostic information for an activity in a second process, the second process called by the first process in a computing environment 100. The operations of the method can be performed utilizing the structure described above.

In operation 605, the second process, process B, is initialized. During initialization, the second process can request an allocation of log buffer memory from the kernel 40, e.g. log buffer memory 300 of FIG. 3. The second process can request that the log buffer memory 300 be registered with the kernel 40 such that the kernel 40 can read diagnostic information from the log buffer memory 300, even after a processing operation of the first process has failed.

Optionally, in operation 610, the second process can also determine an activity log buffer 310 within the log buffer memory 300 for logging one or more instances of one or more activities received by the second process. The activity log buffer 310 can also be registered by the kernel 40 and associated with the second process. After initialization, the second process can begin receiving requests to perform processing activities. In one embodiment, the second process can receive a request from a first process, at connector 699, to perform a processing operation for an activity on behalf of the first process.

In operation 612, the second process receives and redeems a voucher with attributes of the calling first process. In an embodiment, the attributes include the activity ID and instance value of a processing activity. Upon redemption of the voucher, the second process can adopt the attributes of the first process that are contained within the voucher, for use in performing a processing operation on behalf of the first process.

In operation 620, the second process can determine whether the activity corresponding to the activity ID is new to the second process, or whether the activity has been previously received by the second process. The second process can also receive new processing activities requested directly of the second process at operation 620, rather than via a call from a first process at entry point 699. Upon receiving a new activity requested of the second process directly, the second process can request and receive an activity ID from the kernel 40 as described in operation 520 of FIG. 5, above. For clarity, the operation is not shown in FIG. 6.

If it is determined at operation 620 that the activity is new to the second process, then at operation 625 the second process determines an available log buffer 320, from within the log buffer memory 300 for the second process. The log buffer 320 is for logging diagnostic information for the activity ID received in the voucher, or for a newly received activity.

In operation 630, the second process can register the activity ID, log buffer 320, and a log buffer descriptor value or identifier so that the kernel 40 can identify the specific log buffer 320 for the activity from the one or more log buffers 320 in log buffer memory 300. If the activity is new to the second process, as determined in operation 620, then registration can include, in one embodiment, the kernel 40 generating an activity description record 41 for the activity, and can further include generating a process reference record, e.g., 42, and linking the process reference record to the activity description record. If the method is called at entry point 699, then registration can include generating a process reference record, e.g. 42, and linking 8 the process reference record to the activity description record 41. In one embodiment, the registration process occurs within kernel 40. Alternatively, registration can be implemented using a registration service accessible by the kernel 40.

If the activity was received directly by the second process, then an initial instance value of the activity ID can be set in operation 635. In one embodiment, the initial instance value of the activity ID can be one. If the method was called from a first process at entry point 699, then the instance value for the activity can be set to the instance value for the activity that was received in the voucher at operation 612.

If, in operation 620, the activity received by the second process is not a new activity for the second process (i.e., an instance of the activity was previously received by the second process), then the second process can increase the instance value of the activity in operation 540. In one embodiment, the activity instance value is incremented.

In operation 645, the second process can optionally log the activity ID and instance value of the activity received by the second process, in activity log buffer 310. In one embodiment, activity log buffer 310 is a circular, or ring, buffer. Thus, the activity log buffer 310 can continuously log activity IDs and instance values as they are received, overwriting the oldest activity ID and instance value in the activity log buffer 310, as needed.

In operation 650, the second process determines whether the log buffer 320 for the activity is within a threshold value of being full. In one embodiment, the second process determines whether the log buffer 320 is within 10% of the total number of entries for the log buffer 320. If so, then in operation 655 log buffer space for the activity, in log buffer 320, can be freed. In one embodiment, the second process can determine a highest instance value for the activity that has successfully completed all processing operations for the activity within the process. The second process can then free buffer space in the log buffer 320 for the activity at, and below, the highest instance for the activity that has successfully completed all processing operations for the activity within the second process. In another embodiment, the second process can call the kernel 40 to determine, for all processes that are, or have been, performing processing operations for the activity, the highest instance value of the activity for which all processing operations for the activity instance have successfully completed. In one embodiment, the kernel 40 can make the determination by maintaining a variable representing the highest instance value of the activity that has completed all processing operations for each process. The variable can be maintained by the kernel 40 within the process reference record, 42, 43, or 44, for the process within the kernel 40. In another embodiment, the kernel can inspect the activity log buffer 320 of each process to make the determination. In yet another embodiment, the second process can maintain a variable for tracking the highest instance value of an activity that has completed all processing operations for the second process. The second process can maintain this variable in the buffer management area 305.

In operation 660, the second process can log diagnostic information for the activity ID and instance value in a log buffer 320 for the activity. Diagnostic information is described in detail with reference to FIG. 11.

In operation 665, the second process can determine whether the services of a third process, process C, are needed to complete the processing activity. If the second process determines that processing of the activity does not require a service from a second process, then the method resumes at operation 620. The second process can receive new instances of activities at 620 and/or 699.

In operation 665, if the second process determines that the services of a third process, process C, are needed to complete the activity, then the method continues at operation 670. In operation 670 the second process can request that voucher management module 210 send a voucher reference, e.g. 209, to the third process, as described in detail below with reference to FIG. 8. The second process can then request that the third process, process C, perform one or more processing operations on behalf of the second process at connector 699'. Connector 699' represents entry into a method substantially identical to that shown in FIG. 6, at entry point 699, with references within FIG. 6 modified to indicate calling the third process, process C, by the second process, process B.

Figure 7:
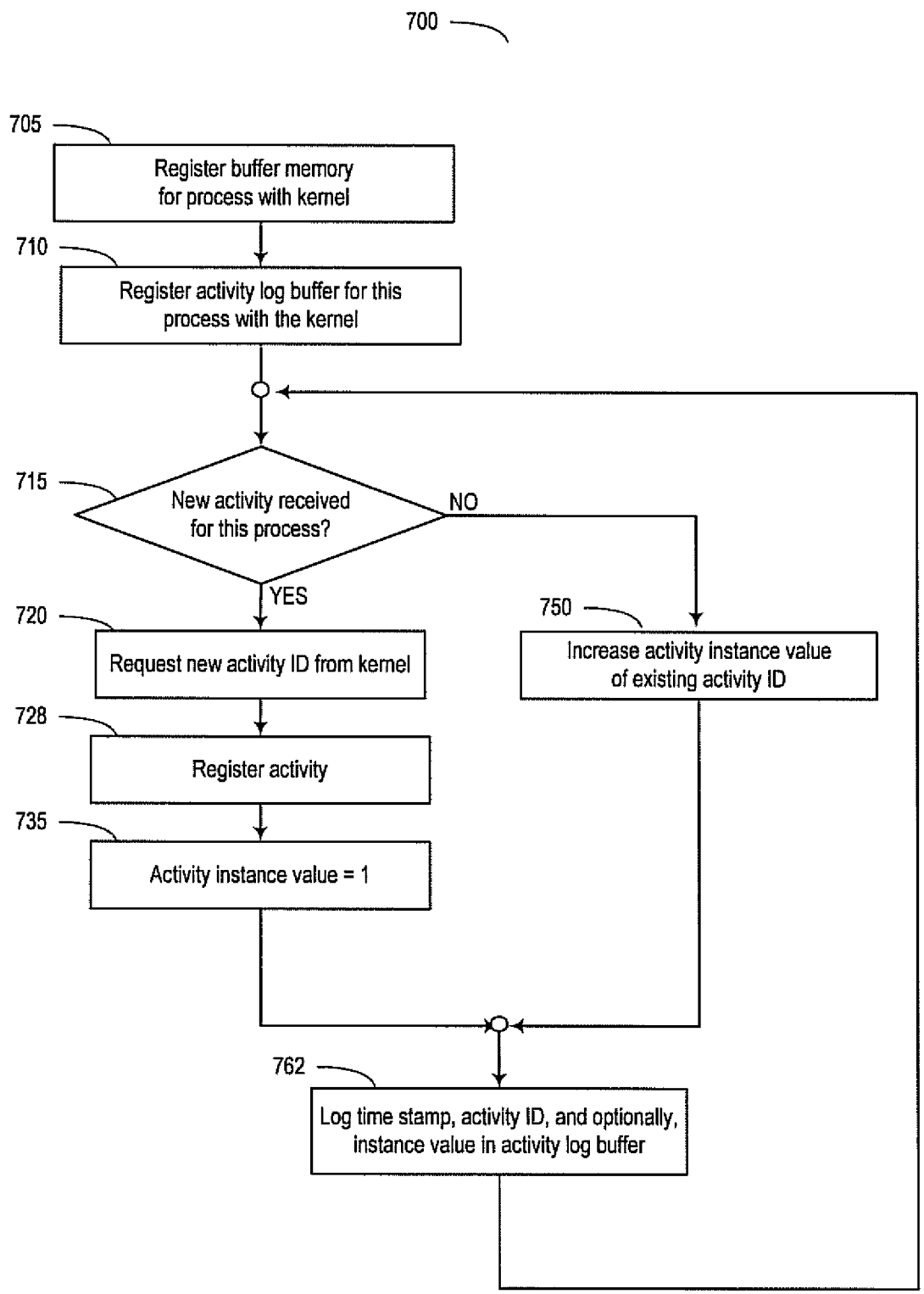
FIG. 7 illustrates a flow chart of a method for logging one or more instances of one or more activities received by a process.

FIG. 7 illustrates a flow chart of a method for logging one or more instances of one or more activities received by a process, independent of diagnostic information logging of one or more instances of one activity.

In operation 705, the process is initialized. During initialization, the process can request an allocation of log buffer memory from the kernel 40, e.g. log buffer memory 300 of FIG. 3. The process can request that the log buffer memory 300 be registered with the kernel 40 such that the kernel 40 can read diagnostic information from the log buffer memory 300, even after a processing operation of the first process has failed.

In operation 710, the process can determine an activity log buffer 310 within the log buffer memory 300 for logging one or more instances of one or more activities received by the process. The activity log buffer 310 can also be registered by the kernel 40 and associated with the process. After initialization, the process can begin receiving requests to perform processing activities.

In operation 715, the process receives a request to perform a processing activity. The process can determine whether the activity is new to the process, or whether the activity has been previously received by the process. In one embodiment, the determination can be made by the process inspecting the buffer data management area 305 of the log buffer memory 300 to determine whether the activity has a corresponding activity ID in the buffer data management area 305. In another embodiment, the determination can be made by the process calling the kernel 40 to determine whether the activity has a corresponding activity description record 41, and whether the process has a corresponding process reference record, e.g. 42, linked to the activity description record 41. The call can be made by an API, shared memory, via a socket, or inter-process communication.

If, in operation 715, it is determined that the activity is new to the process, the process can request a new activity identifier (activity ID) for the activity from the kernel 40. The activity ID can be unique within the process. In one embodiment, the activity ID is unique within the computing environment 100. The request can be made via an API, shared memory, a socket, or inter-process communication.

In operation 728, the process can register the activity with the kernel 40. In one embodiment, registration can include the kernel 40 generating an activity description record 41 for the activity, generating a process reference record, e.g. 42, for the process and linking the process reference record, e.g. 42, to the activity description record 41, as described above with reference to FIGS. 5 and 6. The process reference record, e.g. 42, can contain a reference to the activity log buffer 310, the process, the log buffer memory 300, and the log buffer data management area 305 such that the kernel 40 can read the activity log buffer 310 even after a failure of a processing task within the process. Alternatively, registration can be implemented using a registration service accessible by the kernel 40.

An initial instance value of the activity ID can be set in operation 735. In one embodiment, the initial instance value of the activity ID can be one.

If, in operations 715, the activity received by the process is not a new activity for the process (i.e., an instance of the activity was previously received by the process), then the process can increase the instance value of the activity in operation 740. In one embodiment, the activity instance value is incremented.

In operation 762, instances of activities received by the process can be logged in the activity log buffer 310. Logging can include storing a timestamp that the instance of the activity was received, the activity ID of the activity, and optionally the instance value of the activity received by the process. In one embodiment, additional information can be logged with an instance of an activity, including an internet address or socket number from which the request to perform the activity originated, a system identifier of the computing system from which the request originated, software and operating system identification, etc.

After logging of activity information, the method continues at operation 715.

FIG. 8 illustrates a block diagram of a voucher subsystem 200 within an operating environment 100. A voucher subsystem 200 includes a voucher management module 210, one or more attribute managers 220, and a system management module 230. The voucher subsystem 200 can further include one or more attribute managers 240 implemented in user memory space. In one embodiment, the voucher management module 210, attribute managers 220, and system management module 230 are components of the kernel 40. Processes 10, 20, and 30 can communicate with the kernel 40 and voucher management module 210 via interfaces 1, 2, and 3 respectively. Kernel 40 can manage communications between processes 10, 20, and 30. In one embodiment, communications between processes 10, 20, and 30 can be managed by voucher management module 210. In one embodiment, interfaces 1, 2, and 3 can be implemented using inter-process communication, sockets, shared memory, system calls, or one or more Application Programming Interfaces (APIs). Application Program Interfaces are described in detail below with reference to FIG. 12. Interfaces 1, 2, and 3, need not be implemented using the same interface type. For example, interface 1 can be implemented using shared memory, interface 2 can be implemented via an API, and interface 3 can be implemented using shared memory.

A process, e.g. process 10, can have attributes that are to be shared with, or transferred to, a second process, e.g. process 20. Process attributes can include a priority of a process, security privileges, an activity ID of a processing operation, power management attributes, activity scheduling attributes, and other attributes of a process. A process, e.g. process 10 using interface 1, can request that one or more process attributes be registered as a voucher by the voucher management module 210. The voucher management module 210 can generate and store the voucher and return a voucher reference, e.g. voucher reference 205, via interface 1 to the requesting process 10. If process 10, e.g., requires the services of another process, e.g. process 20, then process 10 can request that voucher management module 210 prepare a voucher reference 207 based upon the voucher referenced by voucher reference 205, and send voucher reference 207 to process 20. Alternatively, in one embodiment, process 10 can pass voucher reference 205 to process 20 via inter-process communication, to become process 20's voucher reference 207. In one embodiment, process 10 passes voucher reference 205 to process 20 in the same call to process 20 in which process 10 requests that process 20 perform a task on behalf of process 10. Voucher management module 210 can prepare and register the voucher reference 207, and send the voucher reference 207 to process 20 via interface 2. Process 20 can then redeem the voucher reference 207 with voucher management module 210 such that process 20 can adopt the attributes of process 10 in accordance with the voucher referenced by voucher reference 207. Process 10 can then call process 20 to perform a processing task on behalf of process 10.

In one embodiment, vouchers can be created, destroyed, reference-counted, copied, validated (or invalidated), or maintained via voucher management module 210. Data structures corresponding to vouchers may be stored within voucher management module 210. In an embodiment, voucher management module 210 can destroy a voucher when the voucher is no longer referenced (e.g. the voucher reference count is zero). Voucher references 205, 207, and 209 can be references corresponding to actual vouchers stored in voucher management module 210. In an embodiment, the voucher references 205, 207, and 209 can further include a data structure having the voucher attributes stored by the voucher management module 210.

Voucher attributes and associated attribute values can be managed via an attribute manager 220, residing in the kernel 40, and/or attribute manager(s) 240 residing in user memory. Attribute manager(s) can be registered in voucher management module 210 to provide different functions via corresponding attributes values (or tags, or keys) in vouchers. These functions may include activity tracing, importance donation, power assertion management, activity scheduling, and other application functions.

In an embodiment, an attribute manager can determine attribute values for a corresponding attribute, e.g., as requested via voucher management module 210. An attribute manager can maintain runtime relationships among execution instances (e.g. processes, threads, etc.) referencing (or having) vouchers specifying the corresponding attribute vales. Attribute managers can request updates on properties (e.g. security privileges, priorities, etc.) of execution instances and/or system components, (e.g. power management) via system management module 230. A process attribute value of an attribute in a voucher can be changed by an attribute management module, such as 220 or 240. For example, process 10 can have a processing priority attribute with a processing priority number (attribute value) of, e.g. 5. Process 10 can request a voucher from voucher management module 210 that includes an attribute for processing priority. Voucher management module 210 can return a voucher reference 205 to process 10. Process 10 can then request that a voucher reference 207, referencing the same voucher as voucher reference 205, be sent to process 20. Process 20 can receive and redeem the voucher referenced by voucher reference 207. Process 20 can then adopt the same processing priority as process 10 when performing processing operations on behalf of process 10. Attribute management module, e.g. 220 or 240 can then change the processing priority attribute value for the voucher from 5 to 4, e.g. In response, system management module 230 can change the processing priority for the processes that reference the voucher having the changed attribute value. As a result, processing operations performed by both process 10 and process 20 that are associated with the voucher referenced by vouchers 205 and 207 will be processed using processing priority 4.

A process can return a voucher by sending a message to the voucher management module 210. For example, process 20, performing a processing task on behalf of process 10, can receive a voucher reference 207 to a voucher containing processing attributes of process 10. After process 20 completes a processing task on behalf of process 10, process 20 can request that voucher reference 207 be returned to voucher management module 210. Accordingly, a reference counter to the voucher stored within the voucher management module 210, referenced by voucher reference 207, can be decremented. If the reference count of a voucher reaches zero, the voucher can be destroyed by the voucher management module 210.

Figure 9:
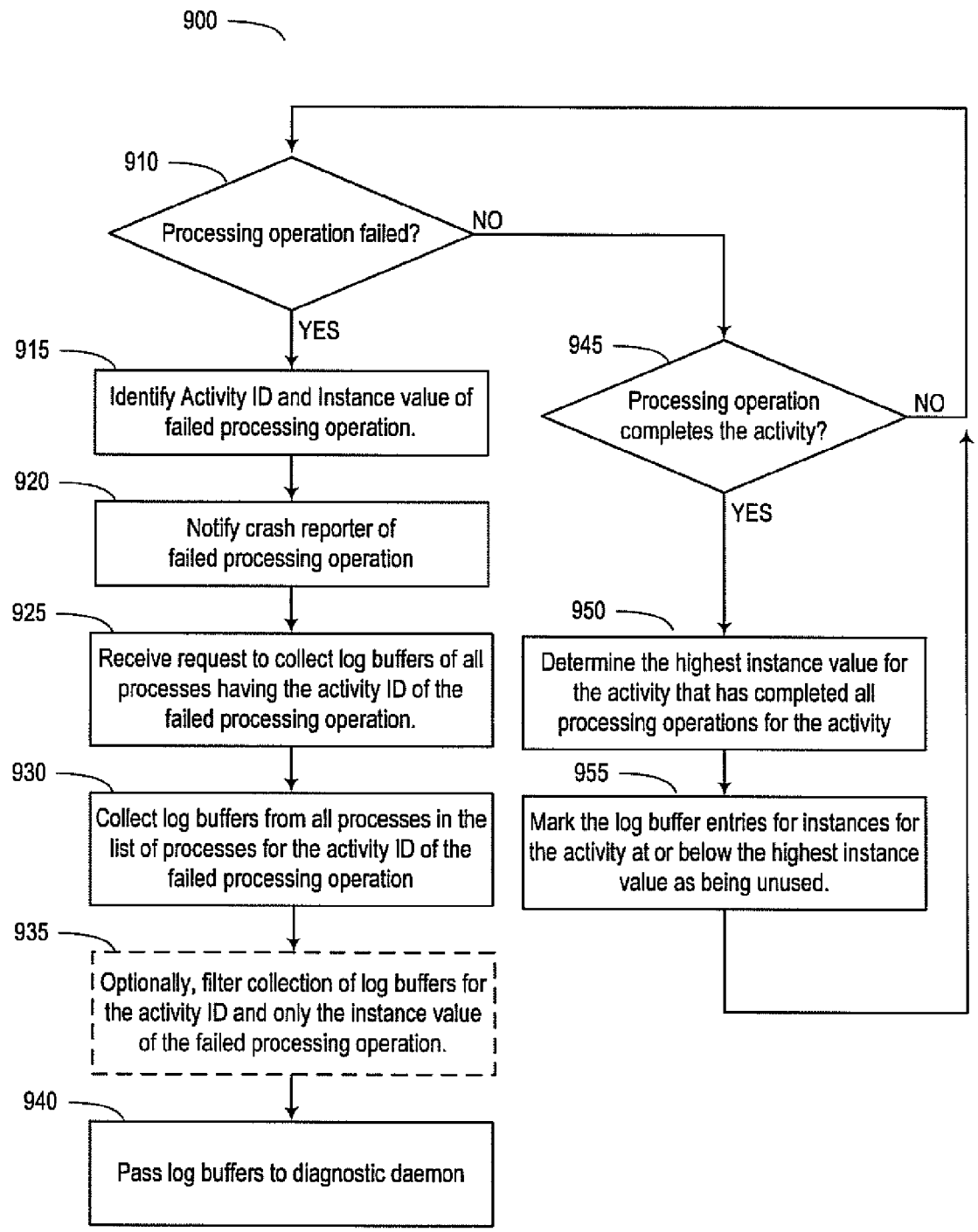
FIG. 9 illustrates a flow chart of a method collecting log buffers of diagnostic information associated with an activity, after a process failure.

FIG. 9 illustrates a flow chart of a method 900 of collecting log buffers of diagnostic information related to a failed processing task for an activity.

In operation 910, the kernel 40 can detect a failure of a processing operation in a process within computing environment 100.

If a processing operation fails, in operation 915, the kernel 40 can determine the activity ID and instance value of the failed processing operation.

In operation 920, the kernel 40 can notify the crash reporter 60 of the failure of the processing operation. In one embodiment, the crash reporter 60 notifies the diagnostic service 50 of the failure of the processing operation. In one embodiment the notification includes the activity ID and instance value of the failed processing operation.

In embodiments where the crash reporter 60 notifies the diagnostic service 50 of the failure, in operation 925 the diagnostic service 50 can request the log buffers, either, or both, the activity log buffers 310 and the log buffers for an activity 320, from all of the processes in the computing environment 100 that performed a processing operation for the activity of the failed processing operation. In another embodiment, in operation 925 the crash reporter 60 can request that the kernel 40 send the log buffers from all processes in the computing environment 100 that performed a processing operation for the activity and instance value of the failed processing operation to the diagnostic service 50.

In operation 930, the kernel 40 can collect log buffers from all processes that performed a processing task for the activity of the failed processing operation. Collecting log buffers can include one, or both, of activity log buffers 310 and log buffers 320 for the activity (collectively, and separately, log buffers 3x0). In one embodiment, the kernel 40 can perform the operation by looking up the activity description record 41 of the activity having the failed processing operation. The kernel 40 can then collect log buffers 3x0 from each process in the linked list 8 of processes linked to the activity description record 41.

In one embodiment, in operation 935, the kernel 40 can optionally filter the collection of log buffers 3x0 before passing the log buffers to the diagnostic service 50. Filtering can include operations for, e.g., excluding log buffer 3x0 entries before a specific timestamp, excluding successfully completed instances of the activity corresponding to the activity of the processing operation that failed, or excluding activity instances in the activity log buffers 310 of one or more specified activities.

In operation 940, the kernel 40 can pass the collected log buffers 3x0, optionally filtered, to the diagnostic service 50.

If in operation 910, the kernel 40 did not detect a failure of a processing operation for an activity, then in operation 945 it is determined whether the processing operation is the last processing operation to complete the activity. If so, then log buffer space used by one or more successfully completed instances of the activity can be marked as unused, or otherwise reused, such as by overwriting the data in the log buffer entries of one or more successfully completed instances of the activity. If, in operation 945, it is determined that this is not the last process operation to complete the processing activity, then the method resumes at operation 910. Otherwise the method continues at operation 950.

In operation 950, the kernel 40 determines the highest instance value for the activity that has successfully completed all processing operations for the activity across all processes that have performed a processing ask to complete an instance of the activity.

In operation 955, the kernel frees the log buffer space for all processes for the instances of the processing activity that have successfully completed all processing operations for the activity. In one embodiment, freeing log buffer entries comprises marking freed log buffer entries as "unused," or "available." Such entries can be overwritten with new log buffer information in accordance with the operations of FIG. 5 through FIG. 7, above.

Figure 10:
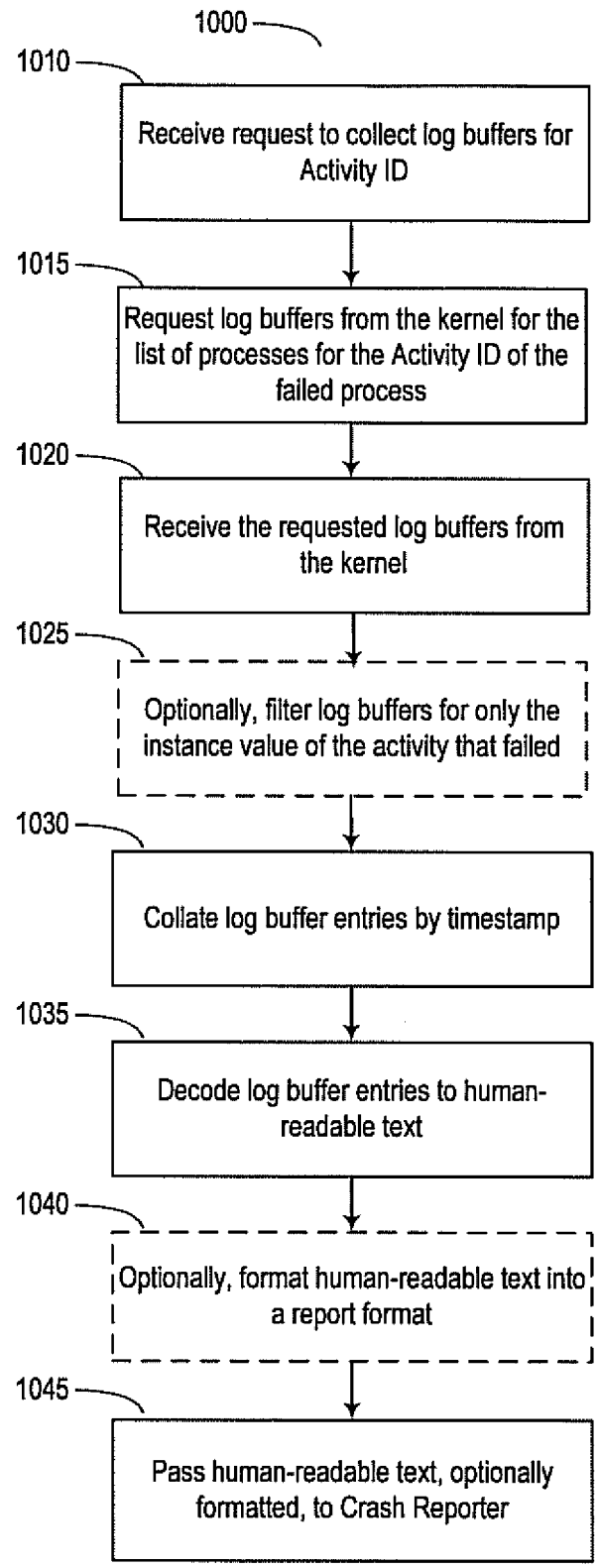
FIG. 10 illustrates a flow chart of a method of preparing a diagnostic report from collected log buffers of diagnostic information.

FIG. 10 illustrates a flow chart of a method 1000 of preparing a diagnostic report by the diagnostic service 50 from log buffers of diagnostic information collected by the kernel 40 and passed to the diagnostic service 50, as described with reference to FIG. 9, above.

In operation 1010, diagnostic service 50 can receive a request to collect log buffers from the kernel 40, the log buffers related to a failed processing operation of an activity. In one embodiment the request is received from the crash reporter 60. As described above, with reference to FIG. 9, the log buffers can include one, or both, of activity log buffers 310 and log buffers 320 for an activity (collectively, and separately, log buffers 3x0). As also described above in FIG. 9, the collected log buffers 3x0 can optionally be filtered by the kernel 40 before being passed to the diagnostic service 50.

In operation 1020, the diagnostic service 50 can receive the collected log buffers 3x0, optionally filtered, from the kernel 40.

In one embodiment, in operation 1025, the diagnostic service 50 can optionally filter the log buffers 3x0. Filtering can include operations for, e.g., excluding log buffer 3x0 entries before a specified timestamp, excluding log buffer entries corresponding to successfully completed instances of the activity, or excluding activity instances in the activity log buffers 310 of one or more specified activities.

In operation 1030, diagnostic service 50 can collate the entries from the log buffers 3x0. Collating log buffers 3x0 can include, collating log entries by timestamp, by process identifier, by processing operation identifier, or activity ID, or activity ID and instance value.

In operation 1035, the diagnostic service 50 can decode each of the collated log entries into human-readable text using the processing operation identifier to retrieve a message text and formatting string that can be used to format one or more optional parameters of the log buffer entries into the message text, to generate the human-readable text. Decoding of log entries is further described with reference to FIG. 11, below.

In operation 1040, the decoded, collated log entries can optionally be formatted into a report format with headings, indentation, page numbers, etc.

In operation 1050, the decoded, optionally filtered, collated, and optionally formatted log buffer entries can be passed to the crash reporter 60 as a human-readable text report.

Figure 11:
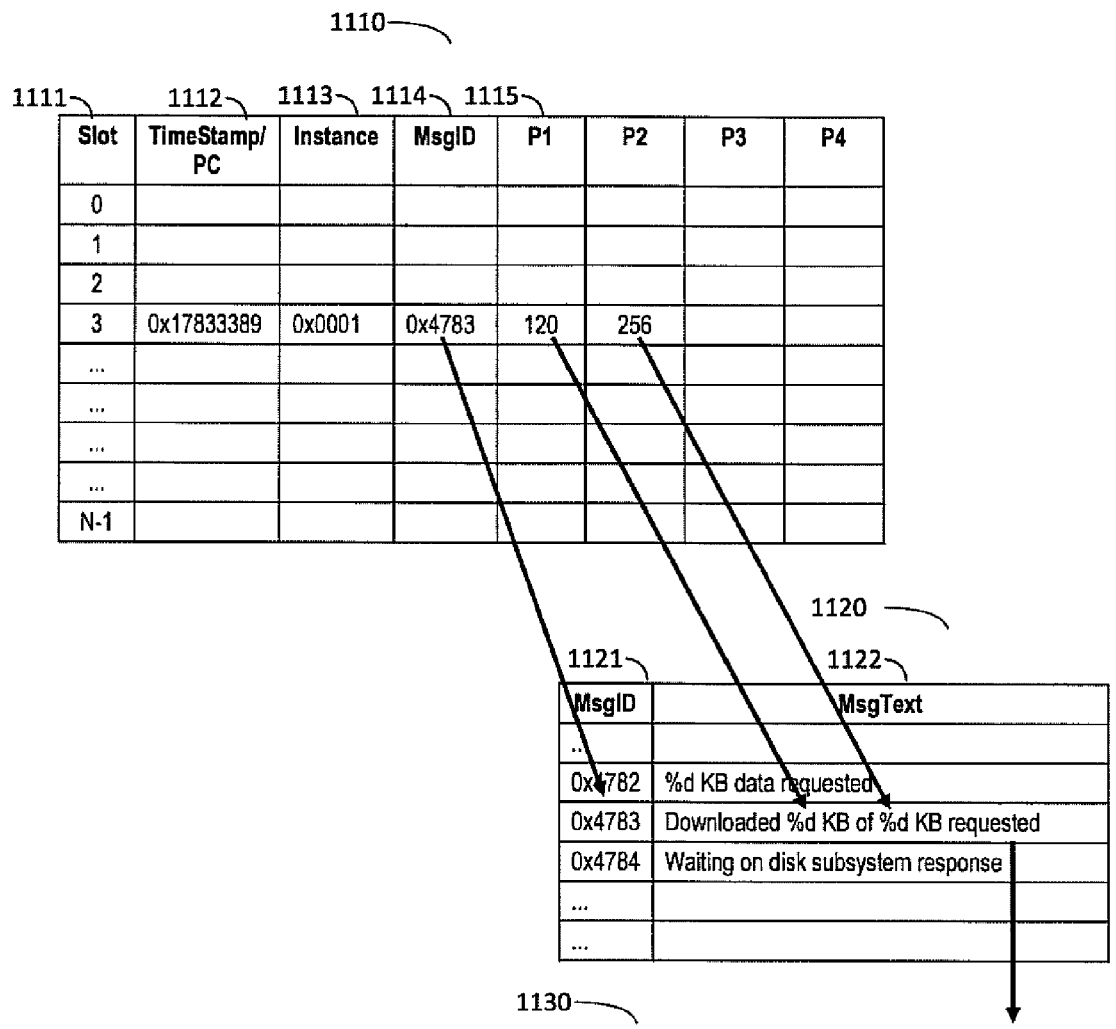
FIG. 11 illustrates a detailed view of encoded diagnostic information in an activity log buffer and a decoded, text version of the diagnostic information.

FIG. 11 illustrates a detailed view of encoded diagnostic information in an activity log buffer 1110 and a decoded, text version of the diagnostic information 1130. Activity log buffer 1110 entries can be converted to human readable text by log file collector process 45 in kernel 40, by a diagnostic service 50, or by crash reporter 60. In one embodiment, the activity log buffer is converted to human-readable text by the log file collector process 45. As described above, with reference to FIG. 2, when, e.g., process 10 receives a new activity, process 10 requests an activity identifier (activity ID) from the kernel 40. The kernel generates an Activity Description record 41 that stores the activity ID, the activity name, and generates a linked list 8 of processes, 41, 42, and 43, that perform processing operations to accomplish the activity. Process 10, the first process to receive the activity, in this example, is the process requesting that the kernel 40 generate the activity ID. Thus process 10 is the first process having a process reference record in the linked list 8. Each process reference record, e.g. process record 42 for process 10, can include descriptive information about the process, such as the process name and a pointer to log buffer memory for process 10. As described above, with reference to FIG. 3, each log entry of diagnostic information in an activity log buffer 1110 can include a timestamp or program counter (PC) 1112, an instance value 1113 representing an instance number of the activity, a message identifier (message ID) 1114, and one or more parameters 1115. A slot number 1111 references a specific log entry in an activity log buffer 1110. In one embodiment, a log entry can have both a timestamp and a program counter as ordinal references to processing operations. As described above, in one embodiment a portion of a log buffer for an activity can have a portion carved out for each instance of a processing activity. In such an embodiment, the instance value can optionally be logged.

To convert the encoded activity log buffer 1110 entry at slot 3 into human-readable text, the timestamp and/or program counter can be output in text form of its hexadecimal value, or converted to a convention time value in hours, minutes, seconds, milliseconds, etc. Since a log buffer 1110 for an activity only logs diagnostic information for one activity for one process, both the process name and the activity can be determined from the activity description record 41 and, e.g., the process reference record 42 for process 10. The instance value 1113 of the log entry can also be output as a text value. Message ID 1114 references a text message, e.g. message ID 0x4783, that is stored in programming code, or other text table resources, accessible by the kernel 40 and by the diagnostic service 50. Example message ID 0x4783 contains a text message and formatting string 1122, "Downloaded % d KB of % d KB requested." Parameter P1 can represent the number of KB downloaded so far, and parameter P2 can represent the number of KB requested for downloading. Concatenating the timestamp string, process description from activity description record 41, process description from the process reference record, e.g. 42, the instance number of the activity, and formatting in the parameters P1 and P2, the message 1130 is generated as human-readable text for generating a report to pass to the crash reporter 60.

Figure 12:
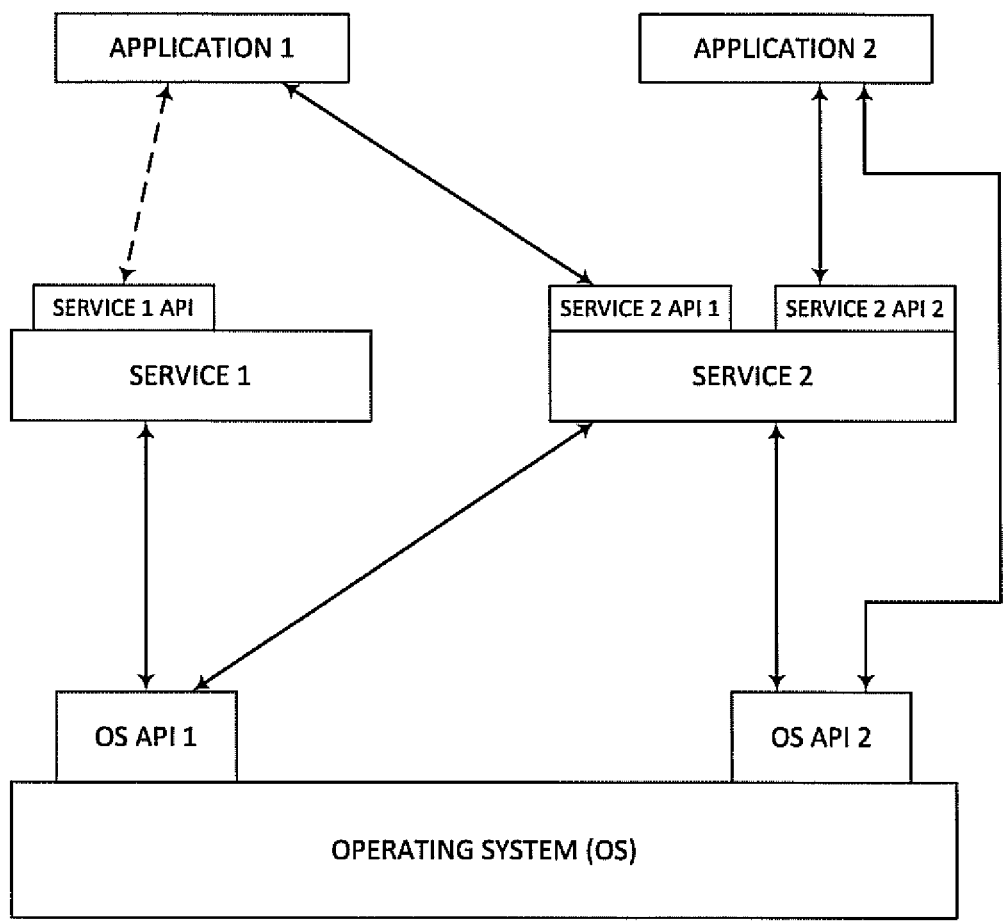
FIG. 12 illustrates an exemplary embodiment of a software stack usable in some embodiments of the invention.

In FIG. 12 ("Software Stack"), an exemplary embodiment, applications can make calls to Services A or B using several Service APIs and to Operating System (OS) using several OS APIs. A and B can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both OS API 1 and OS API 2, Application 2 makes calls to and receives returned values from OS API 2.

Figure 13:
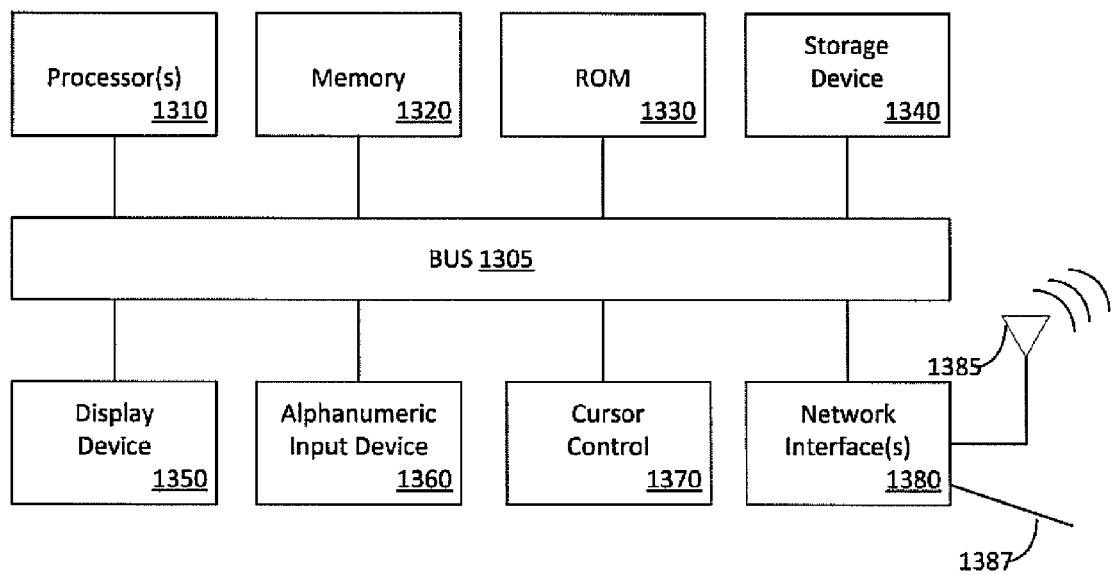
FIG. 13 is a block diagram of one embodiment of an exemplary computing system.

FIG. 13 is a block diagram of one embodiment of a computing system 1300. The computing environment 100, described above, can be implemented using one or more computing systems 1300.

The computing system illustrated in FIG. 13 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 13 may be used to provide a client device and/or a server device.

Computing system 1300 includes bus 1305 or other communication device to communicate information, and processor 1310 coupled to bus 1305 that may process information.

While computing system 1300 is illustrated with a single processor, computing system 1300 may include multiple processors and/or co-processors 1310. Computing system 1300 further may include random access memory (RAM) or other dynamic storage device 1320 (referred to as main memory), coupled to bus 1305 and may store information and instructions that may be executed by processor(s) 1310. Main memory 1320 may also be used to store temporary variables or other intermediate information during execution of instructions by processor 1310.

Computing system 1300 may also include read only memory (ROM) and/or other static storage device 1340 coupled to bus 1305 that may store static information and instructions for processor(s) 1310. Data storage device 1340 may be coupled to bus 1305 to store information and instructions. Data storage device 1340 such as flash memory or a magnetic disk or optical disc and corresponding drive may be coupled to computing system 1300.

Computing system 1300 may also be coupled via bus 1305 to display device 1350, such as a cathode ray tube (CRT) or liquid crystal display (LCD), to display information to a user. Computing system 1300 can also include an alphanumeric input device 1360, including alphanumeric and other keys, which may be coupled to bus 1305 to communicate information and command selections to processor(s) 1310. Another type of user input device is cursor control 1370, such as a touchpad, a mouse, a trackball, or cursor direction keys to communicate direction information and command selections to processor(s) 1310 and to control cursor movement on display 1350.

Computing system 1300 further may include one or more network interface(s) 1380 to provide access to a network, such as a local area network. Network interface(s) 1380 may include, for example, a wireless network interface having antenna 1385, which may represent one or more antenna(e). Computing system 1200 can include multiple wireless network interfaces such as a combination of WiFi, Bluetooth and cellular telephony interfaces. Network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, network interface(s) 1380 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A non-transitory computer-readable medium comprising processor-executable instructions that, when executed, perform a method comprising:
    receiving, by a first process in a computing environment, an initial request to perform a processing activity;
    requesting, from the computing environment, an activity ID, wherein the activity ID is an identifier for the processing activity that is unique within one of the computing environment or the first process;
    requesting that the computing environment register the activity ID and a reference to a log buffer of the first process for the processing activity;
    logging, in the log buffer of the first process, one or more processing operations that are performed by the first process in response to receiving the initial request to perform the processing activity.

2. The computer-readable medium of claim 1, further comprising registering, with the activity ID and reference to a log buffer of the first process, a reference to the first process.

3. The computer-readable medium of claim 1, further comprising registering, with the activity ID and reference to a log buffer of the first process, an instance value of the activity.

4. The computer-readable medium of claim 1, wherein logging comprises, for each processing operation performed, storing a timestamp and an identifier of the processing operation performed in the log buffer of the first process, storing an instance value of the activity in the log buffer of the first process, and wherein the logging defines a sequence of processing operations associated with the processing activity.

5. The computer-readable medium of claim 4, further comprising:
    receiving a subsequent request to perform the processing activity, by the first process in the computing environment;
    increasing the instance value of the activity; and
    logging, in the log buffer of the first process, one or more processing operations that are performed by the first process in response to receiving the subsequent request to perform the processing activity.

6. The computer-readable medium of claim 4, further comprising:
    communicating one or more attributes of the first process to a second process, wherein the one or more attributes include the activity ID and the instance value for the activity ID; and
    calling the second process to perform a processing operation on behalf of the first process for the activity ID and the instance value;
    logging, by the first process, the calling of the second process.

7. The computer-readable medium of claim 6, wherein the first and second processes are sandboxed with respect to each other such that the first process can access volatile memory allocated to it but cannot access volatile memory allocated to the second process and vice versa.

8. The computer-readable medium of claim 4, further comprising:
    determining that the log buffer of the first process is within a threshold value of being full;
    freeing log buffer space used by one or more successfully completed instances of the activity.

9. The computer-readable medium of claim 8, wherein freeing log buffer space comprises receiving a determination that the log buffer contains diagnostic information of a sequence of processing operations that have successfully completed.

10. A non-transitory computer-readable medium comprising processor-executable instructions that, when executed, perform a method comprising:
    receiving, from a first process by a second process in a computing environment, a communication including one or more attributes of the first process, wherein the one or more attributes include an activity ID of a processing activity and an instance value for the processing activity;
    requesting that the computing environment register the second process, the activity ID, the instance value, and a reference to a log buffer of the second process, in response to receiving the communication;
    performing one or more processing operations related to the processing activity, by the second process, in response to receiving the communication;
    logging, in the log buffer of the second process, diagnostic information associated with the one or more processing operations that are performed by the second process on behalf of the first process, each processing operation associated with the activity ID and instance value.

11. The computer-readable medium of claim 10, wherein the first and second processes are sandboxed with respect to each other.

12. The computer-readable medium of claim 10, wherein logging comprises, for each processing operation performed, storing a timestamp, an identifier of the processing operation performed, and the instance value of the processing activity in the log buffer associated with the second process, and wherein the communication is an inter-process communication.

13. The computer-readable medium of claim 12, further comprising:
    determining that the log buffer for the second process is within a threshold value of being full;
    freeing log buffer space used by one or more successfully completed instances of the processing activity.

14. The computer-readable medium of claim 13, wherein freeing log buffer space comprises receiving, from the computing environment, an indication of a highest instance value for the activity ID for which all processing operations in the sequence of operations have successfully completed; and
    freeing log buffer space for log buffer entries having an instance value less than or equal to the highest instance value for the processing activity for which all processing operations in the sequence of processing operations have successfully completed for both the first and second processes.

15. The computer-readable medium of claim 13, wherein freeing log buffer space comprises permitting the freed log buffer space to be overwritten with log buffer entries having a later timestamp than the log buffer entries in the freed log buffer space.

16. A non-transitory computer-readable medium comprising processor-executable instructions that, when executed, perform a method comprising:
    determining that a processing operation in a process has failed, the failed processing operation having an activity ID and an instance value;
    extracting log buffer entries from a log buffer of the process, the log buffer associated with the activity ID and containing log buffer entries for the activity ID; and
    transmitting the extracted log buffer entries having the activity ID to a diagnostic service.

17. The computer-readable medium of claim 16, further comprising extracting activity log buffer entries from an activity log buffer of each process that performed a processing operation having the activity ID of the failed processing operation.

18. The computer-readable medium of claim 17, wherein the processing operation is the failed processing operation.

19. The computer-readable medium of claim 16, further comprising:
    extracting, from an activity log buffer of the process, activity log entries of activities received by the process in which the processing operation failed, wherein activity log buffer entries comprise a timestamp and an activity ID that identifies a processing activity received by the process.

20. The computer-readable medium of claim 16, wherein extracting log buffer entries comprises extracting only log buffer entries having the activity ID and a specified instance value of the processing activity.

21. The computer-readable medium of claim 16, further comprising:
    extracting log buffer entries from a log buffer of each process that performed a processing operation having the activity ID, wherein each log buffer is associated with the activity ID and contains log entries for the activity ID.

22. A computer-implemented method comprising:
    receiving, from a first process by a second process in a computing environment, a communication including one or more attributes of the first process, wherein the one or more attributes include an activity ID of a processing activity and an instance value for the processing activity;
    requesting that the computing environment register the second process, the activity ID, the instance value, and a reference to a log buffer of the second process, in response to receiving the communication;
    performing one or more processing operations, by the second process, in response to receiving the communication;

logging, in the log buffer of the second process, diagnostic information associated with the one or more processing operations that are performed by the second process on behalf of the first process, each processing operation associated with the activity ID and instance value.

23. The method of claim 22, wherein the first and second processes are sandboxed with respect to each other.

24. The method of claim 22, wherein logging comprises, for each processing operation performed, storing a timestamp, an identifier of the processing operation performed, and the instance value of the processing activity in the log buffer associated with the second process, and wherein the communication is an inter-process communication.

25. The method of claim 22, further comprising:
   determining that the log buffer for the second process is within a threshold value of being full;
   freeing log buffer space used by one or more successfully completed instances of the processing activity.

26. The method of claim 25, wherein freeing log buffer space comprises receiving, from the computing environment, an indication of a highest instance value for the activity ID for which all processing operations in the sequence of operations have successfully completed; and
   freeing log buffer space for log buffer entries having an instance value less than or equal to the highest instance value for the processing activity for which all processing operations in the sequence of processing operations have successfully completed for both the first and second processes.

27. The method of claim 25, wherein freeing log buffer space comprises permitting the freed log buffer space to be overwritten with log buffer entries having a later timestamp than the log buffer entries in the freed log buffer space.

* * * * *